United States Patent
Lang et al.

(10) Patent No.: US 6,188,699 B1
(45) Date of Patent: Feb. 13, 2001

(54) MULTI-CHANNEL ENCODER/DECODER

(75) Inventors: Steven Forbes Lang; Winston Ki-Cheong Mok, both of Vancouver; Larrie Simon Carr, Burnaby; Richard Arthur John Steedman, Vancouver; Glenn Kenneth Bindley, North Vancouver, all of (CA)

(73) Assignee: PMC-Sierra Ltd., Burnaby (CA)

( * ) Notice: Under 35 U.S.C. 154(b), the term of this patent shall be extended for 0 days.

(21) Appl. No.: 08/989,162

(22) Filed: Dec. 11, 1997

(51) Int. Cl.$^7$ .................................................. H04J 3/02

(52) U.S. Cl. ..................... 370/463; 370/400; 370/419; 370/439; 370/458

(58) Field of Search .......................... 370/337, 412, 370/419, 431, 437, 439, 458, 459, 463, 400, 401, 402, 421, 462, 465, 466, 376, 314

(56) References Cited

U.S. PATENT DOCUMENTS

| | | | |
|---|---|---|---|
| 4,897,835 | * 1/1990 | Gaskill et al. | 370/314 |
| 4,991,169 | * 2/1991 | Davis et al. | 370/463 |
| 5,513,183 | * 4/1996 | Kay et al. | 370/337 |
| 5,640,398 | 6/1997 | Carr et al. | 370/376 |
| 5,948,080 | * 9/1999 | Baker | 370/431 |

OTHER PUBLICATIONS

American National Standards Institute, Inc. T1.107–1995 "Digital Hierarchy–Formats Specifications" 1995: pp. 1–98.
ITU–T Recommendation G.704 "Synchronous Frame Structures Used at 1544,6312, 2048, 8488 and 44 736 kbit/s Hierarchical Levels" Jul., 1995: pp. 1–33.
ISO/IEC 3309–1993 (E) "Information Technology–Telecommunications and Information Exchange Between Systems–High–level Data Link Control (HDLC) Procedures–Frame Structure" Dec. 15, 1993: pp. 1–8.

* cited by examiner

*Primary Examiner*—Douglas W. Olms
*Assistant Examiner*—Shick Hom
(74) *Attorney, Agent, or Firm*—Hall, Priddy, Myers & Vande Sande

(57) ABSTRACT

A multi-channel network device for interfacing between a plurality of physical data links and a control processor, where each physical data link is characterized by a data stream of data packets communicated according to a data link control protocol. The multi-channel network device includes a plurality of receive-side line interfaces, with each with each receive-side line interface having at least one channel associated therewith. Each receive-side line interface is operative to receive incoming data packets from one of the physical data links such that each incoming data packet is received in at least one incoming data segment. Each receive-side line interface is also operative to determine a time-slot number for each incoming data segment arriving thereon.

49 Claims, 22 Drawing Sheets

| Flag | Address | Control | Information | FCS | Flag |
|------|---------|---------|-------------|-----|------|
| 01111110 | 8 bits | 8 bits | variable | 16 or 32 bits | 01111110 |
FIG. 1
PRIOR ART
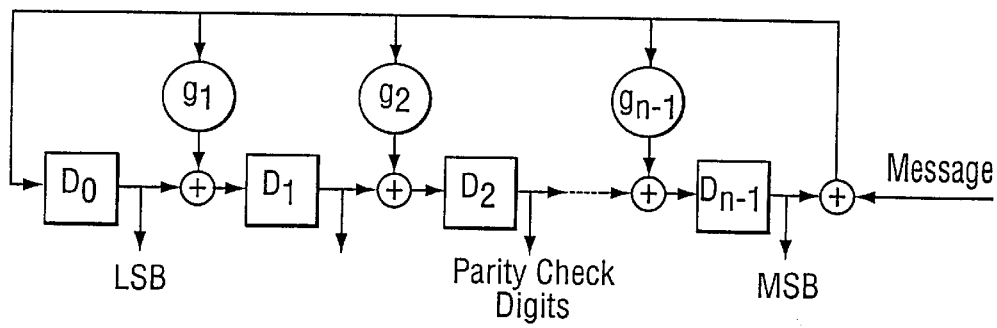
FIG. 2
PRIOR ART
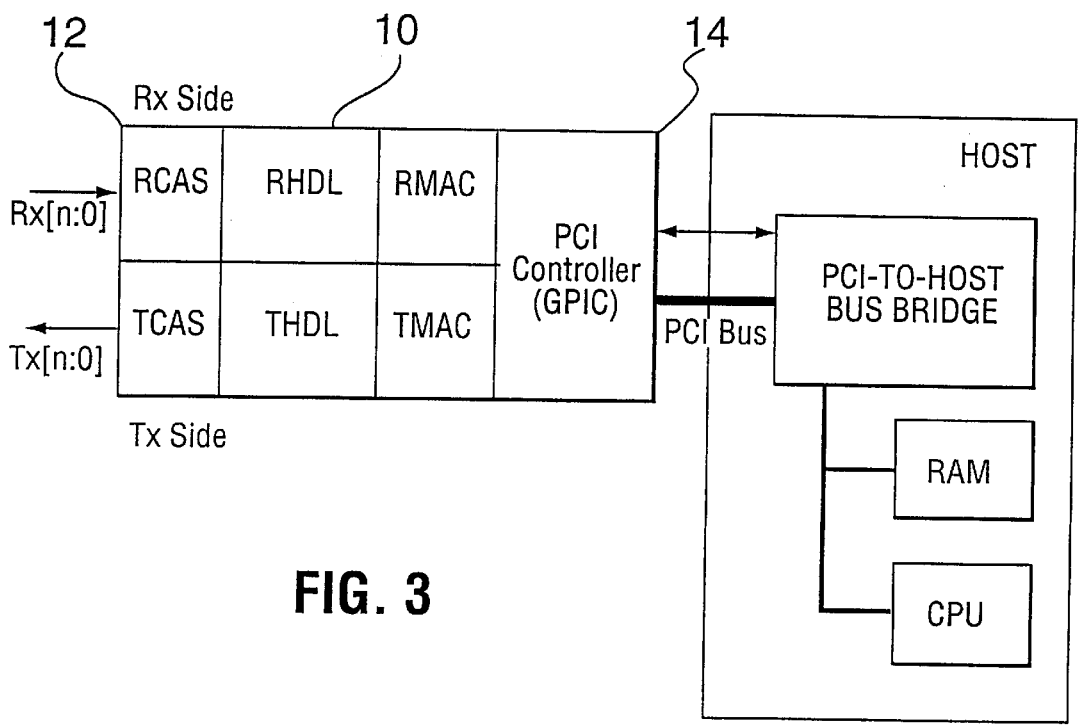
FIG. 3

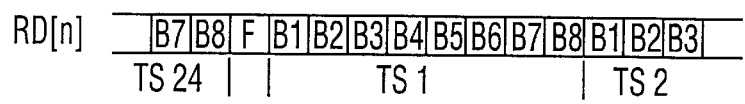
FIG. 7
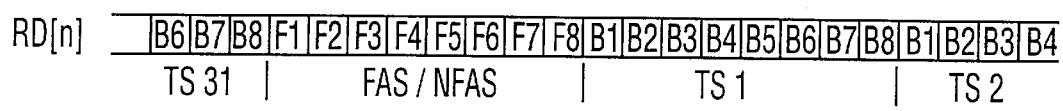
FIG. 8
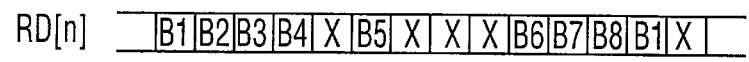
FIG. 9

| | BIT 31 | | | BIT 0 |
|---|---|---|---|---|
| RCC 0 | Bytes Available in Buffer[15:0] | RBC[1:0] | RPD POINTER[13:0] | |
| | Buffer Size[15:0] | Res | V | Start RPD Pointer[13:0] |
| | DMA Current Address[31:0] | | | |
| RCC 1 | Bytes Available in Buffer[15:0] | RBC[1:0] | RPD POINTER[13:0] | |
| | Buffer Size[15:0] | Res | V | Start RPD Pointer[13:0] |
| | DMA Current Address[31:0] | | | |
| | ⋮ | | | |
| RCC 127 | Bytes Available in Buffer[15:0] | RBC[1:0] | RPD POINTER[13:0] | |
| | Buffer Size[15:0] | Res | V | Start RPD Pointer[13:0] |
| | DMA Current Address[31:0] | | | |

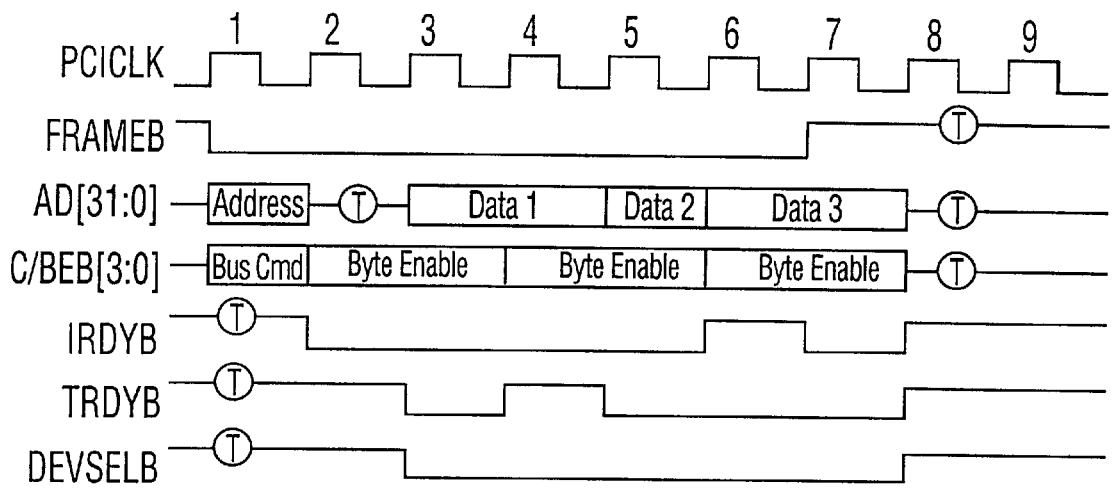
FIG. 22
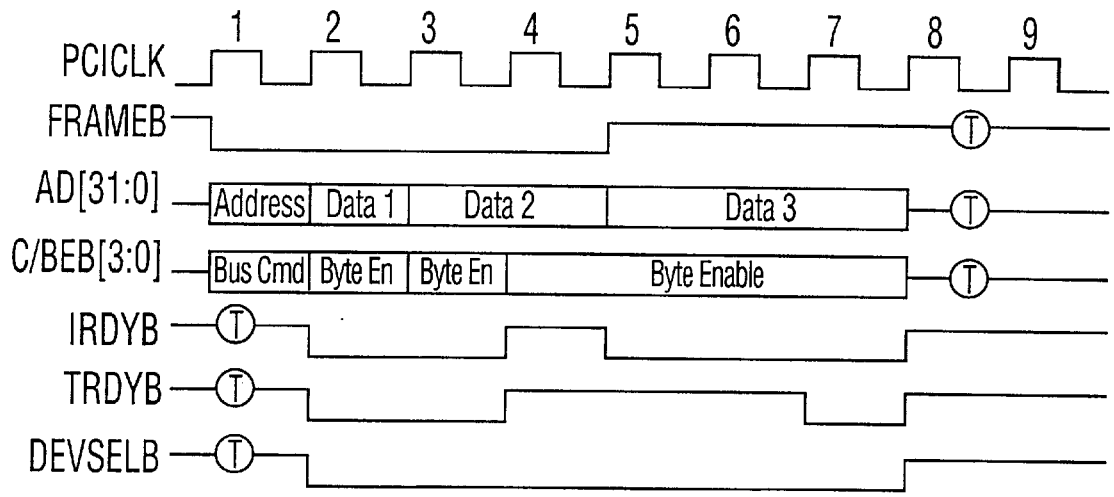
FIG. 23
| Bit 31 | | | | | | | Bit 0 |
|---|---|---|---|---|---|---|---|
| Data Buffer Start Address[31:0] ||||||||
| Bytes in Buffer[15:0] |||| Received(5) | P | V | M | CE | TCC[6:0] |
| Res(2) | TMAC Next TD Pointer [13:0] || ABT | IOC | Host Next TD Pointer[13:0] |||
| Reserved(16) |||| Transmit Buffer Size [15:0] ||||
FIG. 24

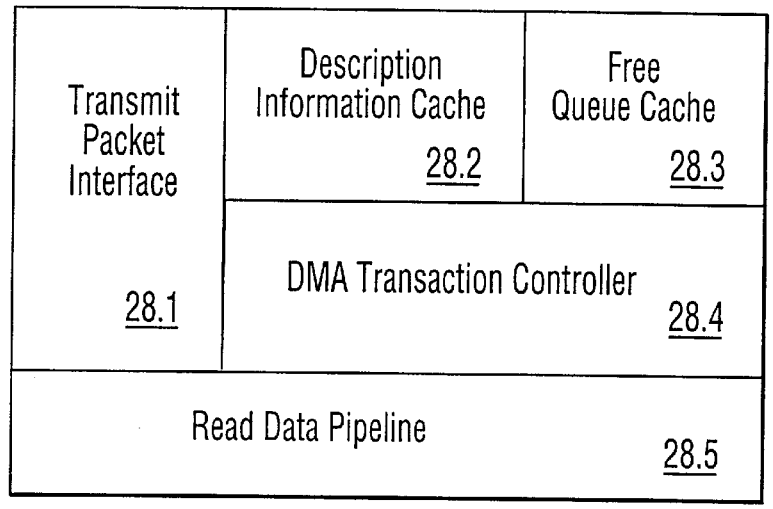

FIG. 27

| | Bit 31 | | | | | | Bit 0 |
|---|---|---|---|---|---|---|---|
| TCC 0, Pri 0 | M | CE | Last TD Pointer [13:0] | A | D | Current TD Pointer [13:0] | |
| | Bytes to Tx[15:0] | | | Abrt | IOC | Host TD Pointer [13:0] | |
| | DMA Current Address [31:0] | | | | | | |
| | Reserved | | PiP | NA | U | Last M | V | Next TD Pointer [13:0] |
| TCC 1, Pri 0 | M | CE | Last TD Pointer [13:0] | A | D | Current TD Pointer [13:0] | |
| | Bytes to Tx[15:0] | | | Abrt | IOC | Host TD Pointer [13:0] | |
| | DMA Current Address [31:0] | | | | | | |
| | Reserved | | PiP | NA | U | Last M | V | Next TD Pointer [13:0] |
| ⋮ | | | | | | | |
| TCC 127, Pri 1 | M | CE | Last TD Pointer [13:0] | A | D | Current TD Pointer [13:0] | |
| | Bytes to Tx[15:0] | | | Abrt | IOC | Host TD Pointer [13:0] | |
| | DMA Current Address [31:0] | | | | | | |
| | Reserved | | PiP | NA | U | Last M | V | Next TD Pointer [13:0] |

FIG. 28

MULTI-CHANNEL ENCODER/DECODER

FIELD

The present invention relates to a multi-channel encoder/decoder for encoding and decoding data communicated over multiple data links according to a data link control protocol such as High-Level Data Link Control (HDLC).

BACKGROUND

A number of devices have been developed which encode and decode data according to a data link control protocol such as HDLC. In providing service at the data link layer, previous devices typically encode or decode a single data stream. In modern digital communications systems, however, there is a need for higher density encoders and decoders capable of handling a variety of data streams. This need has grown as networks increasingly extend across a plurality of digital hierarchies. Often, legacy systems must be connected to emerging systems. Moreover, conventional carrier systems operate at a variety of interface rates, including 1.544 Mb/s, 2.048 Mb/s, 6.312 Mb/s, 8.488 Mb/s and 44.736 Mb/s. As is also well known, both the North American and the European standard for digital hierarchies define framing structures which support channelized communications. Each frame for a specified digital hierarchy consists of a cyclic set of consecutive time slots. For channelized connections in a selected digital hierarchy, a time slot occupying a specified position in the associated frame is allocated to a particular time-derived channel. The diversity of systems making up networks requires a new encoder and decoder capable of concurrently servicing a plurality of data links having different interface rates and having a multiplicity of possible channelized and unchannelized configurations.

Apart from the increasing need for a more robust encoder/decoder, prior art encoders and decoders generally provide simple interfaces to a control microprocessor, which requires the microprocessor to read and write all data to be transmitted and received to and from the encoder and decoder. Such devices are unsuitable for supporting a large number of data links operating at high speeds due to the unacceptably high burden of work placed on the microprocessor. In a high density device it is important that processor intervention is minimized in order to maintain quality of service over all channels and all links.

Accordingly, it is an object of the invention to provide a multi-channel encoder and decoder which fulfills the above needs in the art.

SUMMARY OF THE INVENTION

According to the invention there is provided a multi-channel network device for interfacing between a plurality of physical data links and a control processor, where each physical data link is characterized by a data stream of data packets communicated according to a data link control protocol. The multi-channel network device includes a plurality of receive-side line interfaces, with each receive-side line interface having at least one channel associated therewith. Each receive-side line interface is operative to receive incoming data packets from one of the physical data links such that each incoming data packet is received in at least one incoming data segment. Each receive-side line interface is also operative to determine a time-slot number for each incoming data segment arriving thereon.

The device includes a receive-side priority encoder circuit coupled to the receive-side line interfaces and operative to monitor the receive-side line interfaces and to process the incoming data segments arriving thereon according to a predetermined order of service. A receive-side channel assigner circuit coupled to the receive-side priority encoder circuit is operative to: (i) assign each incoming data segment processed by the receive-side priority encoder circuit to one of the channels; and (ii) pipeline the incoming data segments downstream. There is also provided a receive-side time-slice data processor coupled to the receive-side channel assigner circuit and operative to: (i) receive incoming data segments from the receive-side channel assigner circuit; and (ii) decode ones of the incoming data segments. A receive-side packet buffer processor is coupled to the receive-side time-slice data processor and includes a plurality of receive-side first-in first-out (FIFO) buffers. The receive-side packet buffer processor is operative to: (i) receive incoming data segments from the receive-side time-slice data processor; and (ii) buffer incoming data segments into the receive-side channel FIFO buffers according to the channel of each respective incoming data segment.

The multi-channel network device includes a control processor interface and a receive-side packet management circuit. The receive-side packet management circuit maintains a plurality of receive-side data packet descriptors, each receive-side data packet descriptor referencing a first memory block where one of the incoming data segments can be stored. The receive-side packet management circuit transfers incoming data segments stored in the receive-side channel FIFO buffers to the control processor via a control processor interface and manages the transfer with the receive-side data packet descriptors.

The receive-side priority encoder circuit can be operative to insert a null cycle periodically into the pipeline of incoming data segments so as to permit a microprocessor to access memory locations in a receive section of the device.

The receive-side channel assigner circuit may include a channel memory block and perform a channel lookup into the channel memory block for each incoming data segment by concatenating the link number of the respective receive-side line interface to the time-slot number of the respective incoming data segment.

In another embodiment, ones of the receive-side line interfaces may each include a clock gap detection circuit operative to determine time-slot alignment in channelized data packets. In one embodiment, each receive-side line interface includes a serial-to-parallel converter with a holding register to hold converted data, a time-slot counter coupled to the holding register and a clock activity monitor coupled to the time-slot counter. The time-slot counter is operative to increment each time the holding register is updated with data by the serial-to-parallel converter. The clock activity monitor includes a reference clock input line, a threshold register to store a predetermined value and a clock counter coupled to the reference clock input line and the threshold register and which increments at a reference clock rate.

In another embodiment, at least one of the receive-side line interfaces communicates with one of the physical data links at an interface rate different from the interface rates at which the other receive-side line interfaces communicate with their respective physical data links, such difference in interface rate exceeding a tolerance level encountered where a plurality of line interfaces operate at a single nominal data rate.

The receive-side time-slice data processor may include a plurality of state vectors, each state vector corresponding to one of the channels and having a plurality of data fields to identify a current state of processing data on the corresponding channel, wherein the receive-side time-slice data processor decodes ones of the incoming data segments according to information in the state vectors corresponding to the same channels as the ones of the incoming data segments. In another embodiment, the receive-side time-slice data processor is operative to offset the location of a first incoming data segment of an incoming data packet in the corresponding first memory location referenced by the respective receive-side data packet descriptor so as to permit header information to be pre-pended to the respective incoming data packet.

The receive-side packet buffer processor may include first, second and third receive buffer processors. The first receive buffer processor writes incoming data segments received from the receive-side time-slice data processor into the receive-side channel FIFO buffers. The second receive buffer processor transfers ones of the incoming data segments stored in the receive-side channel FIFO buffers to the receive-side packet management circuit. The third receive buffer processor, coupled to both the first and second receive buffer processors, includes a plurality of transaction counters, each transaction counter associated with a corresponding one of the receive-side channel FIFO buffers. The third receive buffer processor (i) increments each transaction counter associated with the ones of the receive-side channel FIFO buffers written to by the first packet buffer processor, (ii) determines if any of the transaction counters exceed a predetermined threshold value, and (iii) for each transaction counter which exceeds the predetermined threshold value, signals the second receive buffer processor to transfer ones of the incoming data segments stored in the corresponding receive-side channel FIFO buffer up to a predetermined number and decrement the transaction counter associated therewith.

In another embodiment, the receive-side packet management circuit is operative to assign ones of the receive-side data packet descriptors to respective ones of the incoming data segments stored in one of the receive-side channel FIFO buffers and is operative to transfer the respective ones of the incoming data segments from the corresponding receive-side channel FIFO buffer to the ones of the first memory blocks referenced by the assigned ones of the receive-side data packet descriptors.

In another embodiment there is provided a transmit section for communicating outgoing data packets from the control processor to the physical data links. The transmit section includes a plurality of outgoing data channels and requests and receives outgoing data packets in blocks of outgoing data from the control processor wherein each block of outgoing data includes at least one outgoing data segment. In the transmit section there is provided a plurality of transmit-side line interfaces. Each transmit-side line interface communicates with one of the physical data links, generates time slot numbers for channelized communication and generates requests for outgoing data. A transmit-side priority encoder circuit is coupled to the transmit-side line interfaces and monitors the line interfaces for requests for outgoing data. The transmit-side priority encoder services requests for outgoing data according to an order of servicing each physical data link. Requests serviced by the transmit-side priority encoder are processed by a transmit-side channel assigner circuit, which determine the channel number of each request for outgoing data. A transmit-side time-slice data processor receives and processes requests for outgoing data which are assigned a channel number by the channel assigner circuit. The transmit-side time-slice data processor is also operative to encode ones of the outgoing data segments. A transmit-side packet management circuit coupled to the control processor interface, serves to sort the blocks of outgoing data, awaiting transmission from the control processor to the physical data links, into linked lists. Each linked list corresponds to one of the outgoing data channels. The transmit-side packet management circuit is further operative to request and receive from the control processor the blocks of outgoing data in the linked lists.

There is also provided in the transmit section a transmit-side packet buffer processor coupled to the transmit-side time-slice data processor and the transmit-side packet management and which includes a plurality of transmit-side channel FIFO buffers, each transmit-side channel FIFO buffer corresponding to one of the outgoing data channels. The transmit-side packet buffer processor is operative to: (i) receive request for outgoing data from the transmit-side time-slice data processor; (ii) signal the transmit-side packet management circuit to request data from the control processor for storage in the transmit-side channel FIFO buffers; (iii) receive blocks of outgoing data from the transmit-side packet management circuit; and (iv) store each receive block of outgoing data in the transmit-side channel FIFO buffer corresponding to the same outgoing data channel as the linked list to which the received block of outgoing data is associated. Outgoing data segments stored in the transmit-side channel FIFO buffers are retrieved by the transmit-side time-slice data processor for transmission on the corresponding physical data links via the transmit-side line interfaces.

In the transmit section, the transmit-side channel assigner circuit may be operative to perform a channel lookup into a transmit-side channel memory block for each line request to identify the corresponding outgoing data channel from which outgoing data segments are to be sourced. In another embodiment, the transmit-side line interface includes a transmit-side clock gap detection circuit to determine time-slot alignment for outgoing data segments.

The transmit-side packet buffer processor can include a first, second and third transmit buffer processor. In this latter embodiment, the first transmit buffer processor is coupled to the transmit-side channel FIFO buffers and is operative to: (i) send a request for ones of the blocks of outgoing data segments to said transmit-side packet management circuit; and (ii) receive and buffer each requested block into its corresponding transmit-side channel FIFO buffer. The second transmit buffer processor is also coupled to the transmit-side channel FIFO buffers and operative to transfer buffered outgoing data segments from the transmit-side channel FIFO buffers to the transmit-side time-slice data processor according to requests from the transmit-side time-slice data processor. The third transmit buffer processor is coupled to the first transmit buffer processor and the second transmit buffer processor and has a plurality of pairs of free space counters and packet counters, each free space counter and packet counter pair associated with a corresponding one of the transmit-side channel FIFO buffers.

The third transmit buffer processor has several functions. For each transmit-side channel FIFO buffer written to by the first transmit buffer processor, the third transmit buffer processor decrements the corresponding free space counter by the number of buffer memory blocks used to buffer the block of outgoing data segments. For each transmit-side channel FIFO buffer from which the second transmit buffer processor transfers outgoing data segments stored therein, the third transmit buffer processor increments the corresponding free space counter by the number of buffer memory blocks freed in the respective transfer. The third transmit buffer processor also signals the first transmit buffer processor to request data from the transmit-side packet management circuit for ones of the transmit-side channel FIFO buffers according to a predetermined channel order. In one embodiment, the third transmit buffer processor is operative to initiate an expedited request for data to the transmit-side packet management circuit for each transmit-side channel FIFO buffer whose corresponding free space counter is greater than a predetermined free space limit.

In another embodiment, requests for outgoing data are transmitted by the transmit-side priority encoder to the transmit-side channel assigner circuit in a transmit-side pipeline and the transmit-side priority encoder circuit is operative to insert a null cycle periodically into the transmit-side pipeline.

In yet another embodiment, the transmit-side packet management circuit maintains a plurality of transmit-side data packet descriptors, each transmit-side data packet descriptor referencing an external memory block capable of storing ones of said outgoing data segments available for transmission from the control processor. In this embodiment, the transmit-side packet management circuit also maintains a transmit-side ready queue and a transmit-side free queue, with the transmit-side ready queue referencing ready ones of the transmit-side data packet descriptors whose external memory blocks hold outgoing data segments available for transfer from the control processor, and the transmit-side free queue references free ones of the transmit-side data packet descriptors available for managing transfers from the control processor to the transmit-side channel FIFO buffers. In this embodiment the transmit-side packet management circuit moves ready ones of said transmit-side data packet descriptors from the transmits-side ready queue to the transmit-side free queue upon the transfer of the outgoing data segments therein to the transmit-side channel FIFO buffers.

In yet another embodiment, the transmit-side packet buffer processor is operative to dynamically define the size of each transmit-side channel FIFO buffer so as to accommodate different interface rates on the physical data links.

In another embodiment of the invention, there is provided a multi-channel network device for interfacing between a plurality of physical data links and at least one control processor comprising a receive section having a plurality of receive section channel first-in first-out (FIFO) buffers each corresponding to one of a plurality of receive section data channels. In this embodiment the receive section comprises:

(a) interface means for receiving incoming data packets from the physical data links such that each incoming data packet is received in at least one incoming data segment;

(b) means for determining time-slot numbers for incoming data segments arriving on ones of the physical data links having channelized data streams;

(c) means for servicing the incoming data segments received from the physical data links according to a first predetermined order of service for the physical data links;

(d) means for assigning each incoming data segment serviced by the servicing means to one of a plurality of receive section data channels;

(e) means for transmitting incoming data segments serviced by the servicing means downstream in a receive section pipeline;

(f) means for decoding ones of the incoming data segments in the receive section pipeline;

(g) means for buffering each incoming data segment in the pipeline in one of the receive section channel FIFO buffers; and (h) means for transferring incoming data segments stored in the receive section channel FIFO buffers to the control processor according to traffic loads on the receive section data channels.

This latter embodiment may include a transmit section having a plurality of transmit section channel FIFO buffers each corresponding to one of a plurality of transmit section data channels, the transmit section comprising:

(a) means for sorting blocks of outgoing data awaiting transmission from the control processor into linked lists, each linked list corresponding to one of said transmit section data channels, each block of data having at least one outgoing data segment;

(b) means for requesting blocks of outgoing data from the control processor for storage in ones of the transmit section channel FIFO buffers, including means for monitoring the transmit section channel FIFO buffers so as to determine if any of the transmit section channel FIFO buffers requires priority service;

(c) means for receiving and storing the blocks of outgoing data in the transmit section channel FIFO buffers;

(d) interface means for transmitting outgoing data segments on the physical data links;

(e) means for monitoring the transmit section interface means so as to identify requests for outgoing data on the physical data links;

(f) means for servicing requests for outgoing data from the transmit section interface means according to a second predetermined order of service;

(g) means for requesting outgoing data segments stored in the transmit section channel FIFO buffers according to the order of requests for outgoing data from the transmit section servicing means;

(h) means for pipelining outgoing data segments from the transmit section channel FIFO buffers to the transmit section interface means for transmission on the physical data links; and (i) means for encoding ones of the pipelined outgoing data segments prior to transmission on ones of the physical data links.

The present invention also contemplates a method, in a multi-channel network device, of interfacing between a plurality of physical data links and at least one control processor, each of the physical data links characterized by a data stream of data packets communicated according to a data link control protocol, the multi-channel network device supporting channelized and unchannelized modes of communication with the physical data links and having a receive section having a plurality of receive-side data channels and a plurality of receive-side line interfaces, each receive-side line interface operative to communicate with a corresponding one of the physical data links. In the method provided, incoming data packets arriving on the receive-side line interfaces are each received in at least one incoming data segment. Incoming data segments are serviced according to a predetermined order of service. Each incoming data segment serviced in the servicing step are assigned to one of the receive-side data channels and are pipelined to a receive-side time-slice data processor. Ones of the pipelined incoming data segments are processed by the receive-side time-slice data processor according to information in associated state vectors. Each pipelined incoming data segment is stored in one of a plurality of receive-side channel first-in first-out (FIFO) buffers, each receive-side channel FIFO buffer corresponding to one of the receive-side data channels. In this method, a plurality of receive-side data packet descriptors are maintained, with each receive-side data packet descriptor referencing a first memory block capable of holding one of the pipelined incoming data segments stored in the receive-side channel FIFO buffers. Pipelined incoming data segments are transferred from the receive-side channel FIFO buffers via an n-bit data bus to the first memory blocks using the receive-side data packet descriptors, and this transfer is managed according to traffic loads on the receive-side data channels.

In one embodiment of the method, the multi-channel network device includes a transmit section having a plurality of transmit-side data channels and is operative to receive outgoing data packets in blocks of data from a control processor for transmission on ones of the physical data links, each block of outgoing data corresponding to one of the transmit-side data channels and having at least one outgoing data segment. The blocks of outgoing data awaiting transmission from the control processor are sorted into linked lists, each linked list corresponding to one of the transmit-side data channels. A plurality of transmit-side channel FIFO buffers are also monitored so as to manage traffic loads in the transmit section, each transmit-side channel FIFO buffer corresponding to one of the transmit-side data channels. Data is requested from the control processor for storage in the transmit-side channel FIFO buffers based on the results of the monitoring step. Blocks of outgoing data are received by the transmit section based on the data requests, with the reception being managed using transmit-side data packet descriptors. Each block of outgoing data received by the transmit section is written in the transmit-side channel FIFO buffer corresponding to the same transmit-side data channel as the linked list to which the received block is associated. Outgoing data is requested from the transmit side channel FIFO buffers for transmission on ones of the physical data links according to a predetermined order of servicing the transmissions to the physical data links. For each request, the associated transmit-side data channel is determined. Outgoing data segments stored in the transmit-side channel FIFO buffers corresponding to the same transmit-side data channels as the requests are pipelined to a transmit-side time-slice data processor where ones of such outgoing data segments are processed. Each outgoing data segment received by the transmit-side time-slice data processor is transmitted to its corresponding physical data link through a respective transmit-side line interface.

In another aspect of the invention, there is provided a data link layer interface, in a multi-channel network processor operative to receive data packets from a plurality of channelized data streams communicated according to a data link control protocol, each data packet being pipelined through the multi-channel network processor in at least one data segment, the multi-channel network processor having a channel assigner circuit and a time-slice data processor. The data link layer interface comprises: (a) an n-bit wide input bus for receiving a pipelined stream of data segments; (b) a k-bit wide channel bus receiving a data channel number associated with a current data segment on the n-bit wide input bus; (c) a reference clock line for receiving a reference clock so as to sample data on the n-bit wide input bus according to the reference clock; (d) a data valid line for signalling when the n-bit wide input bus contains valid data; and (e) a null data line for reporting a null cycle on the data link layer interface.

In another aspect of the invention, there is provided a method of communicating between a multi-channel network device and a host having host memory with associated buffers. The method includes: defining a plurality of data packet descriptors describing a size and location of said buffers in said host memory and packet status information for use in managing communication of the partial packets or data segments between the multi-channel network device and the control processor; identifying a memory block in a data buffer where one of the data segments can be stored; establishing a usage field operative to indicate an amount of the memory block required by one of the data segments stored therein; utilizing a data channel code field operative to identify a data channel associated with the data segment stored in the memory block identified by the address field; chaining data packet descriptors to link one data packet descriptor to another data packet descriptor so as to allow partial packets or data segments to be chained into a linked list; and indicating an end-of-chain field operative to indicate the end of a linked list of data packet descriptors.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a diagram of the standard frame structure for High-Level Data Link Control protocol;

FIG. 2 is a diagram of a CRC encoder;

FIG. 3 is a system block diagram illustrating one embodiment of a multi-channel encoder/decoder device coupled to a host;

FIG. 7 is a timing diagram illustrating the timing for a channelised T1 receive link in accordance with the present invention;

FIG. 8 is a timing diagram illustrating the timing for a channelised E1 receive link in accordance with the present invention;

FIG. 9 is a timing diagram illustrating the timing for an unchannelised receive link in accordance with the present invention;

FIG. 22 is a timing diagram illustrating the timing for a PCI burst read cycle at the GPIC interface in accordance with the present invention;

FIG. 23 is a timing diagram illustrating the timing for a PCI burst write cycle at the GPIC interface in accordance with the present invention;

FIG. 24 is a diagram illustrating an embodiment of the Transmit Descriptor data structure in accordance with the present invention;

FIG. 27 is a diagram illustrating an embodiment of the Transmit DMA Controller (TMAC) block in accordance with the present invention;

FIG. 28 is a diagram illustrating an embodiment of the Transmit Channel Descriptor Reference (TCDR) Table in accordance with the present invention;

Figure 4:
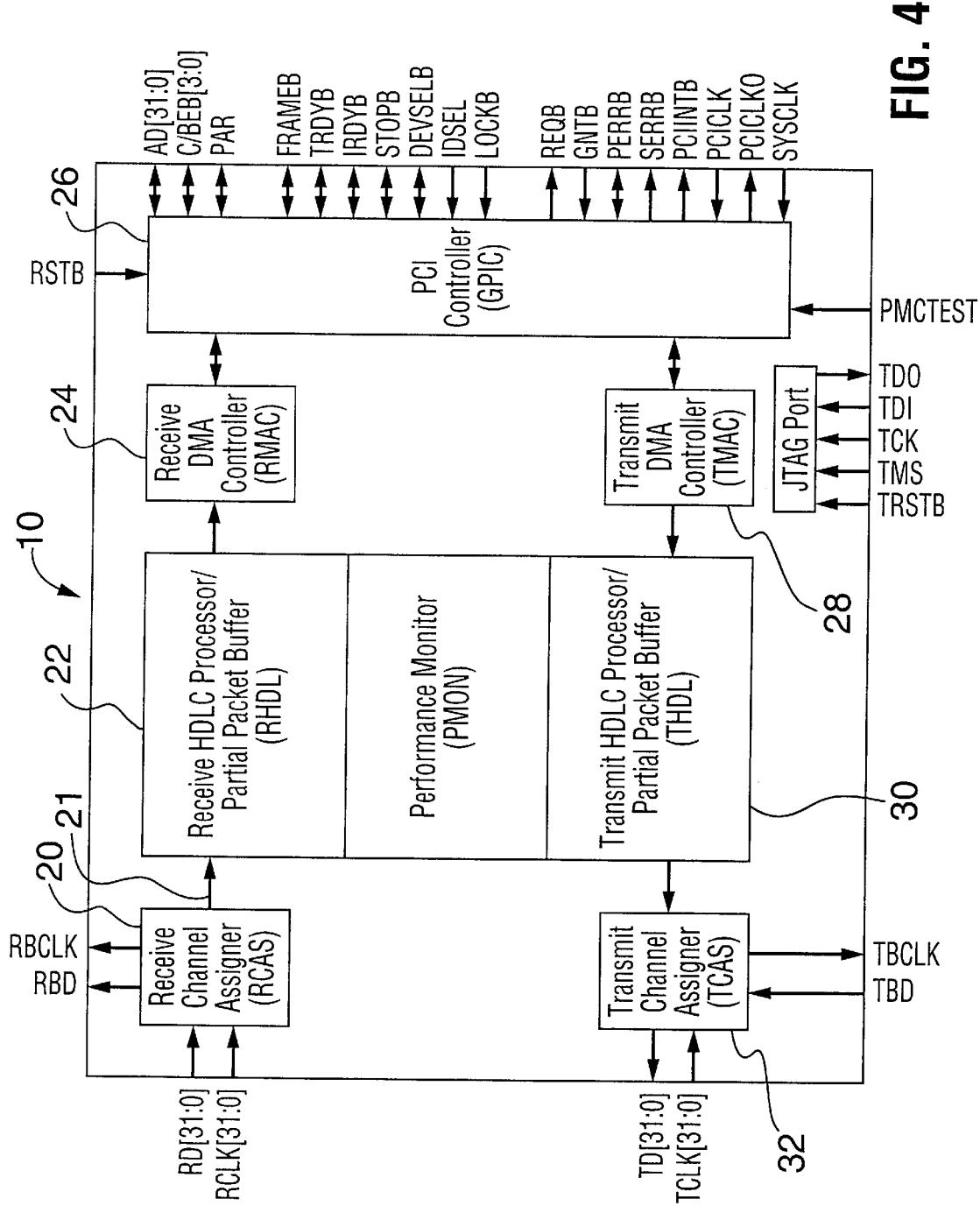
FIG. 4 is a block diagram illustrating an embodiment of the multi-channel encoder/decoder device in accordance with the present invention.

It will be appreciated that for simplicity and clarity of illustration, elements illustrated in the accompanying drawings have not necessarily been drawn to scale. For example, the dimensions of some of the elements are exaggerated relative to other elements for clarity. Furthermore, where considered appropriate, reference numerals have been repeated amoung the drawings to indicate corresponding or analogous elements.

DETAILED DESCRIPTION WITH REFERENCE TO THE DRAWINGS

Referring to FIG. 1, there is shown a diagram of the standard frame structure for synchronous High-Level Data Link Control (HDLC) protocol. HDLC protocol is widely used in the art and serves as the baseline for many other important and well known data link control protocols, including Link Access Procedure Balanced (LAPB), Link Access Procedure D-Channel (LAPD), and Link Access Procedure for Frame-Mode Bearer Services (LAPF). Variations on the HDLC standard are also implemented in other protocols such as the Point-to-Point Protocol (PPP) widely used by the Internet community. For the purposes of illustrating the embodiments described herein, reference is made to the HDLC protocol. However, it will be appreciated that application of the present invention to data communications systems using other related data link control protocols is also contemplated.

As depicted in FIG. 1, the basic frame structure for HDLC (excluding bits inserted for bit-synchronization or bits or octets inserted for data transparency) includes flag, address, control, information and frame checking sequence (FCS) fields. Transmission for an HDLC frame is sequenced left to right. As shown, flag fields are 8 bits, the basic address field is 8 bits, the control field is 8 or 16 bits and the FCS field is 8 or 16 bits. The information field has a variable bit-length which falls within system-specified upper and lower thresholds.

Flag sequences having a 01111110 bit pattern are used for frame synchronization and delineate the opening and closing of HDLC frames (also referred to here as data packets). In networks using HDLC, frame content between flag sequences is examined by the transmitter and a "0" bit is inserted after all sequences of 5 bit contiguous "1" bits in a process known as bit stuffing. Bit stuffing preserves frame synchronization by ensuring that the flag sequence is not simulated within the frame content.

When a station using HDLC protocol receives an incoming stream, the stream is examined for the standard flag sequences so as to identify the opening and closing of an HDLC packet. Identified data packets are bit de-stuffed, wherein each "0" bit which follows 5 contiguous "1" bits is discarded. For the embodiments of the invention presented herein, the minimum packet length is defined as two bytes.

Typically, an HDLC packet is aborted when seven contiguous "1" bits (with no inserted "0" bits) are received. At least one flag byte must exist between HDLC packets for frame delineation. Contiguous flag bytes between packets may be used as an "inter-frame time fill" while adjacent flag bytes may share zeros.

Referring to FIG. 2, the CRC error detection algorithm for the FCS field is typically either a 16 bit FCS or 32 bit FCS function. A general CRC architecture is shown in FIG. 2 using the generating polynomial $g(X) = 1 + g_1 X + g_2 X^2 + \ldots + g_{n-1} - X^{n-1} + X^n$. The 16 bit FCS is two bytes in size and has a generating polynomial $g(X) = 1 + X^5 + X^{12} + X^{16}$. The 32 bit FCS is four bytes and has a generating polynomial $g(X) = 1 + X + X^2 + X^4 + X^5 + X^7 + X^8 + X^{10} + X^{11} + X^{12} + X^{16} + X^{22} + X^{23} + X^{26} + X^{32}$.

Referring to FIG. 3, the multi-channel encoder/decoder device 10 is fabricated as a monolithic integrated circuit which implements HDLC processing and PCI Bus memory management functions for up to k bi-directional channels which may be assigned to individual time-slots within a plurality of independently timed physical links. In the embodiment shown, device 10 serves up to 128 bi-directional channels assignable over up to 32 serial links. However, embodiments supporting a larger or smaller number of physical links and/or a larger or smaller number of channels are also envisioned within the scope of the invention. In FIG. 3 device 10 couples to a plurality of independently timed links on access side 12 and couples to a host computer located on uplink side 14.

For channelised links, channels are assigned to individual time-slots within the physical links. By way of example, for a T1 link in the embodiment illustrated, channel assignment can support the concatenation of time-slots (N×DS0) up to 24 concatenated time slots. For an E1 link, up to 32 concatenated time slots can be supported. It will be appreciated, of course, that other higher and lower channel configurations may be supported and are contemplated within the scope of the present invention. Time slots assigned to any particular channel need not be contiguous within the respective link. For unchannelised links, a selected HDLC stream is processed on a respective unchannelised link.

Both channelised and unchannelised links may be concurrently serviced on device 10. However, it will be noted that the aggregate clock rate of the total links is limited to the maximum device rate. In the embodiment shown, the device rate is 64 MHz, although devices with higher or lower rates are also contemplated within the scope of the present invention.

Referring to FIG. 4, in the receive direction multi-channel encoder/decoder 10 includes receive channel assigner (RCAS) block 20 for channel assignment on up to 32 serial links (RD[31:0]). Assigned incoming packets (and packet segments) from RCAS 20 are delivered to receive HDLC Processor/Partial Packet Buffer (RHDL) block 22 for delineation of packet boundaries, bit de-stuffing and CRC verification. The resulting packet data is placed in internal partial packet buffer RAM which serves as a logical FIFO for each of the assigned channels. Partial packets are fetched out of the partial packet buffer RAM by Receive DMA Controller (RMAC) 24 and are delivered through PCI Controller (GPIC) 26 into host packet memory. A transparent operating mode is supported in the receive direction. For each provisioned transparent channel, multi-channel encoder/decoder 10 directly transfers received octets into host memory verbatim. Where a transparent channel is assigned to a channelised link, octets are aligned to the received time-slots.

In the transmit direction, the host provides packets to transmit using a transmit ready queue. For each provisioned channel, Transmit DMA Controller (TMAC) 28 fetches partial packets (packet segments) from host memory through GPIC 26 for storage in a transmit partial packet buffer in Transmit HDLC Processor/Partial Packet Buffer (THDL) block 30. The transmit HDLC processor reads partial packets out of the transmit partial packet buffer and performs FCS insertion, bit-stuffing and flag sequencing. Processed data is assigned to a particular link by Transmit Channel Assigner (TCAS) 32. TCAS 32 processes up to 128 channels, demultiplexing outgoing data and assigning each byte to any one of 32 outgoing links (TD[31:0]). A transparent operating mode is also supported in the transmit direction. For each provisioned transparent channel, transmitted octets from host memory are inserted directly into the respective link. If a transparent channel is assigned to a channelised link, the octets are aligned to the transmitted time-slots.

A detailed description of each block of device 10 follows.

RECEIVE-SIDE CHANNEL ASSIGNMENT AND LINK COMMUNICATION

In the receive direction, RCAS 20 performs channel assignment, processing up to 32 serial links in the embodiment illustrated. Each link is preferably independent and has its own associated clock (RCLK[31:0]).

Figure 5:
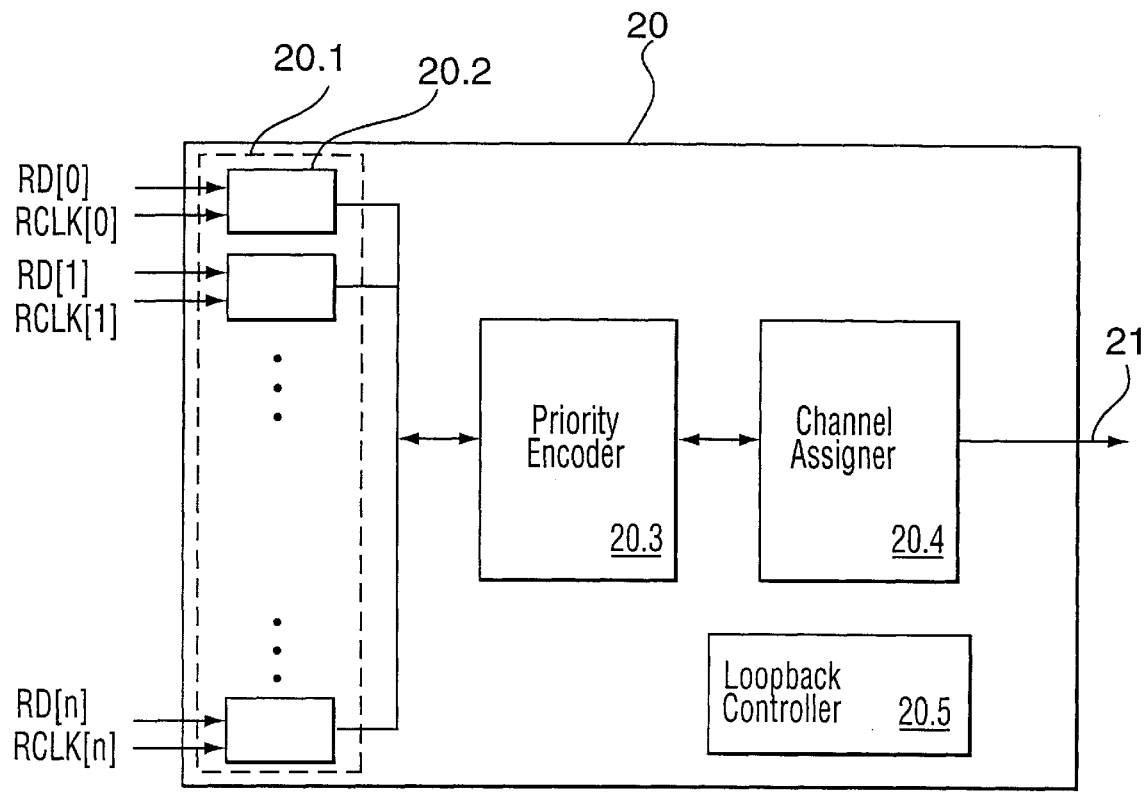
FIG. 5 is a block diagram illustrating an embodiment of the Receive Channel Assigner (RCAS) block in accordance with the present invention.
Figure 6:
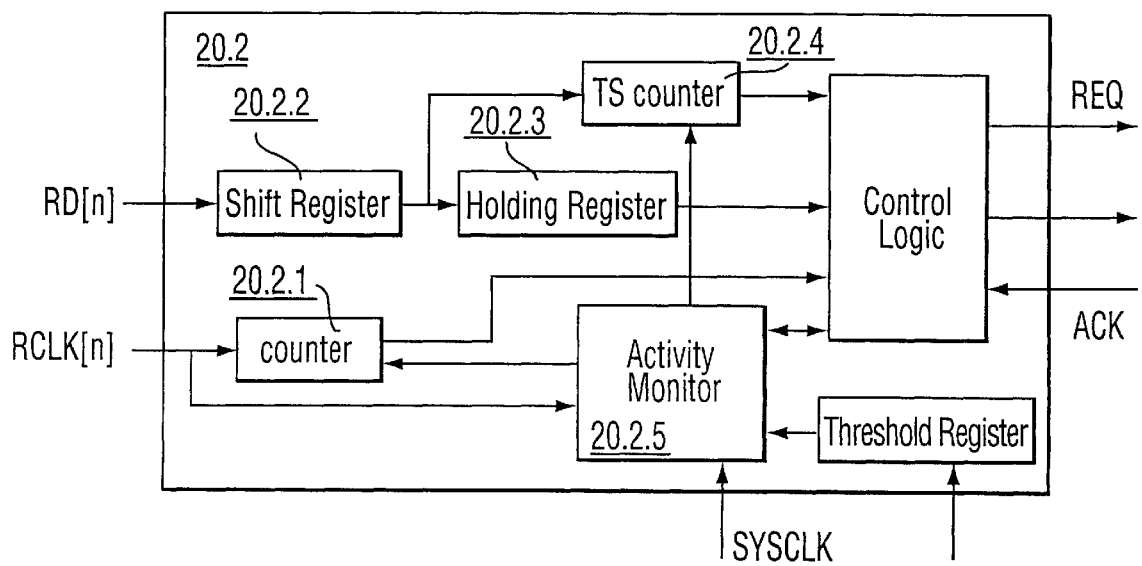
FIG. 6 is a block diagram illustrating an embodiment of a line interface in the RCAS in accordance with the present invention.

Referring to FIG. 5, RCAS 20 receives incoming data on line interface block 20.1 having n line interfaces 20.2. In the embodiment illustrated, 32 line interfaces are provided. As illustrated in FIG. 6 each line interface contains a bit counter 20.2.1, an 8-bit shift register 20.2.2 and a holding register 20.2.3, which together perform serial-to-parallel conversion to form data bytes. Whenever a respective holding register 20.2.3 is updated, a request for service (REQ) is sent to priority encoder 20.3. Once acknowledged by priority encoder 20.3, the respective line interface responds with the data residing in its holding register.

As input to line interface block 20.1, RCAS 20 receives Rx data signals RD[31:0] and Rx line clock signals RCLK[31:0]. RCLK[31:0] contain the recovered line clock for the 32 independently timed links. RD[31:0] contain the recovered line data for the 32 independently timed links. The operational mode of each receive link is configured with a respective internal register. A channelise enable bit configures the corresponding receive link for channelised operation.

To support channelised links, each of line interfaces 20.2 for the embodiment shown includes a time-slot counter 20.2.4 and clock activity monitor 20.2.5. In a particular line interface, time-slot counter 20.2.4 is incremented each time the respective holding register 20.2.3 is updated. A counter in clock activity monitor 20.2.5 increments at the system clock (SYSCLK) rate and is cleared by a rising edge of the respective receive clock (RCLK[i]). Clock activity monitor 20.2.5 and time-slot counter 20.2.4 provide a mechanism by which to determine time-slot alignment in the receive stream by gapping RCLK[i] (referred to here as "clock gapping"). When the counter in clock activity monitor 20.2.5 exceeds a programmable threshold stored in a register in the line interface, a framing bit (T1) or a framing byte (E1) has been detected, in which case bit counter 20.2.1 and timing slot counter 20.2.4 are initialized to indicate that the next bit is the most significant bit (MSB) of the first time-slot.

Referring to FIG. 7, there is shown an example of the timing relationship for a channelised T1 receive link. The receive data stream is a T1 frame with a single framing bit (F) followed by octet-bound time-slots (TS) 1 to 24. As depicted, RCLK[n] is held quiescent during framing bit F so as to gap RCLK[n]. The first data bit (B1 of TS 1) clocked in by the first rising edge of RCLK[n] after framing bit F is the MSB of time-slot 1. While the quiescent period is shown to be a low level on RCLK[n], a high level, effected by extending the high phase of bit B8 of TS 24 is equally acceptable.

Referring to FIG. 8, there is shown an example of the timing relationship of the receive clock (RCLK[n]) and data (RD[n]) signals of a channelised E1 link. The receive data stream is an E1 frame with a single framing byte (F1 to F8) followed by octet-bound time-slots 1 to 31. RCLK[n] is gapped during the framing byte. The data bit B1 of TS 1 is clocked in by the first rising edge of RCLK[n] after the framing byte and is the most significant bit of TS 1.

For unchannelised links, the time-slot counter and activity monitor are held in reset and RCLK[n] is externally gapped during the bits or time-slots that are not part of the transmission format payload (i.e. not part of the HDLC packet). Referring to FIG. 9, in an unchannelised link the receive data is viewed as a contiguous serial stream. There is no concept of time-slots in an unchannelised link. Every eight bits are grouped together into a byte with arbitrary byte alignment. In the timing diagram shown, bits that are to be processed by device 10 are clocked in on the rising edge of RCLK[n] while bits that should be ignored (X) are squelched by holding RCLK[n] quiescent.

Advantageously, clock gapping results in a reduction in the number of signals required. Prior art signaling schemes require three signals per link—a clock, a data signal and a 'data valid' signal, the latter indicating the position of framing bits or bytes as opposed to real data. Although each line interface may be implemented using prior art signaling schemes, the clock gap detection scheme implemented in RCAS 20 allows one to dispense with the 'data valid' signal. In a multi-channel device such as encoder/decoder 10 which supports multiple transmit and receive links, reducing the number of signals required results in corresponding reduction in the number of pins. For example, in the embodiment illustrated in FIG. 4, where there are 32 receive links and 32 transmit links, reducing the number of signals with clock gapping enables one to drop the pin requirements by 64 pins from 2×96 to 2×64, providing a more economical package for mass fabrication.

Priority encoder 20.3 monitors line interface block 20.1 for requests from the individual line interfaces 20.2 and synchronizes them to the SYSCLK timing domain. Requests are processed on a priority basis, preferably in descending order from the respective line interface coupled to RD[0] down to the line interface coupled to RD[31]. Thus, simultaneous requests from RD[i] will be serviced ahead of RD[j], if i<j. As a result, it is preferable in such a priority scheme to connect the highest rate link to RD[0] and the lowest rate link to RD[31].

When there are no pending requests, priority encoder 20.3 generates an idle cycle. In addition, once every n-th SYSCLK cycle (for example, every fourth cycle), priority encoder 20.3 inserts a null cycle where no requests are serviced. The null cycle is used by channel assigner 20.4 and RHDL Partial Packet Buffer Processor 22.2 to permit host microprocessor access to RAMs contained therein for channel configuration. Prior art configurations require a further port dedicated to micro-processor access. Inserting a null cycle on the receive side and the transmit side enables device-wide access to channel configurations by the host without the need for a further RAM port dedicated to micro-processor access.

Figure 10:
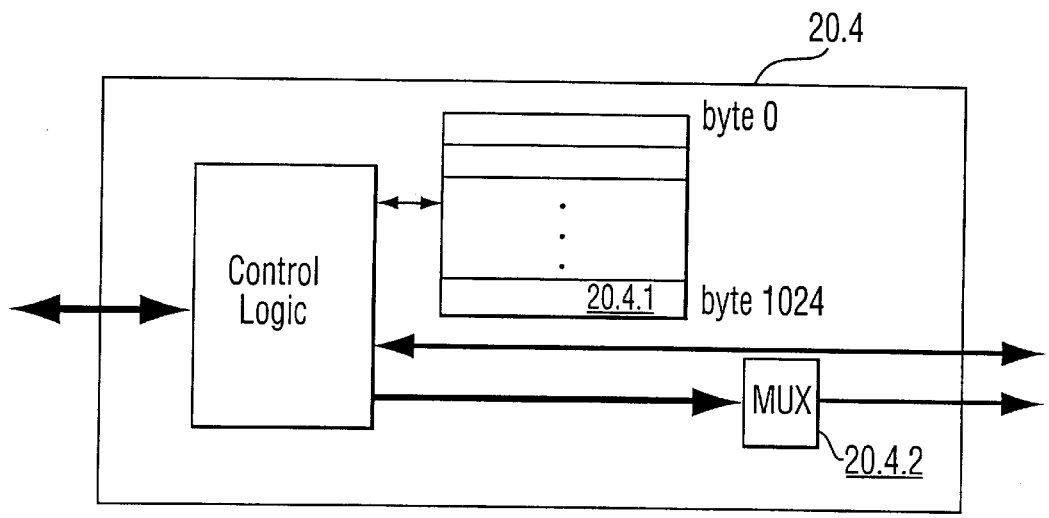
FIG. 10 is a block diagram illustrating a channel assigner circuit forming part of the RCAS in accordance with the present invention.

Referring to FIG. 10, channel assigner block 20.4 determines the channel number of the data byte currently being processed. In the illustrative embodiment, block 20.4 contains a 1024 word channel provision RAM 20.4.1. The channel assigner 20.4 performs a table lookup to indirectly address channel provision RAM 20.4.1 by concatenating the link number and the time-slot number of the current data byte. The fields of each RAM word hold the channel number and a time-slot enable flag. The time-slot enable flag labels the current time-slot as belonging to the channel indicated by the channel number field. For an unchannelized link, all incoming data bytes from such a link are mapped by channel assigner 20.4 to a single pre-determined channel.

Data bytes formed in line interfaces 20.1 are time-division multiplexed with multiplexer 20.4.2, in byte serial format, for delivery to the Receive HDLC Processor/Partial Packet Buffer Processor 22 at SYSCLK rate.

RECEIVE-SIDE HDLC PROCESSING AND PARTIAL PACKET BUFFERING

Referring to FIG. 4, RCAS 20 is coupled at interface 21 to Receive HDLC Processor/Partial Packet Buffer Processor (RHDL) block 22. RHDL block 22 processes byte-synchronous HDLC data streams received from RCAS 20.

Figure 11A:
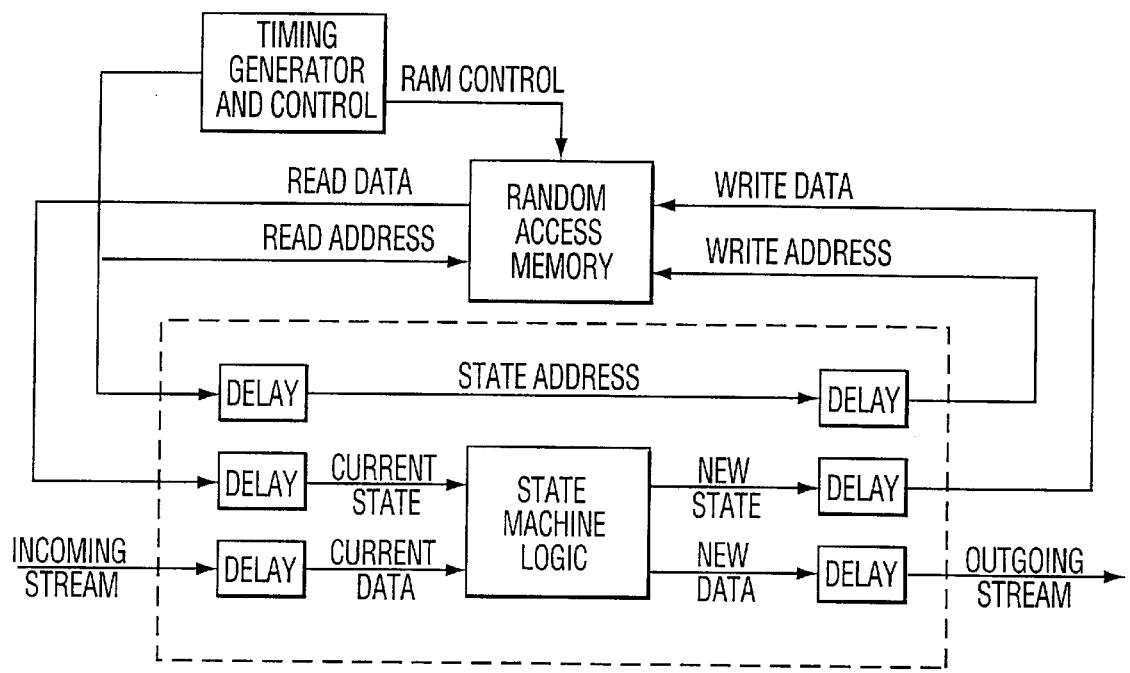
FIG. 11A is a diagram illustrating a state machine architecture for use in the present invention.
Figure 11:
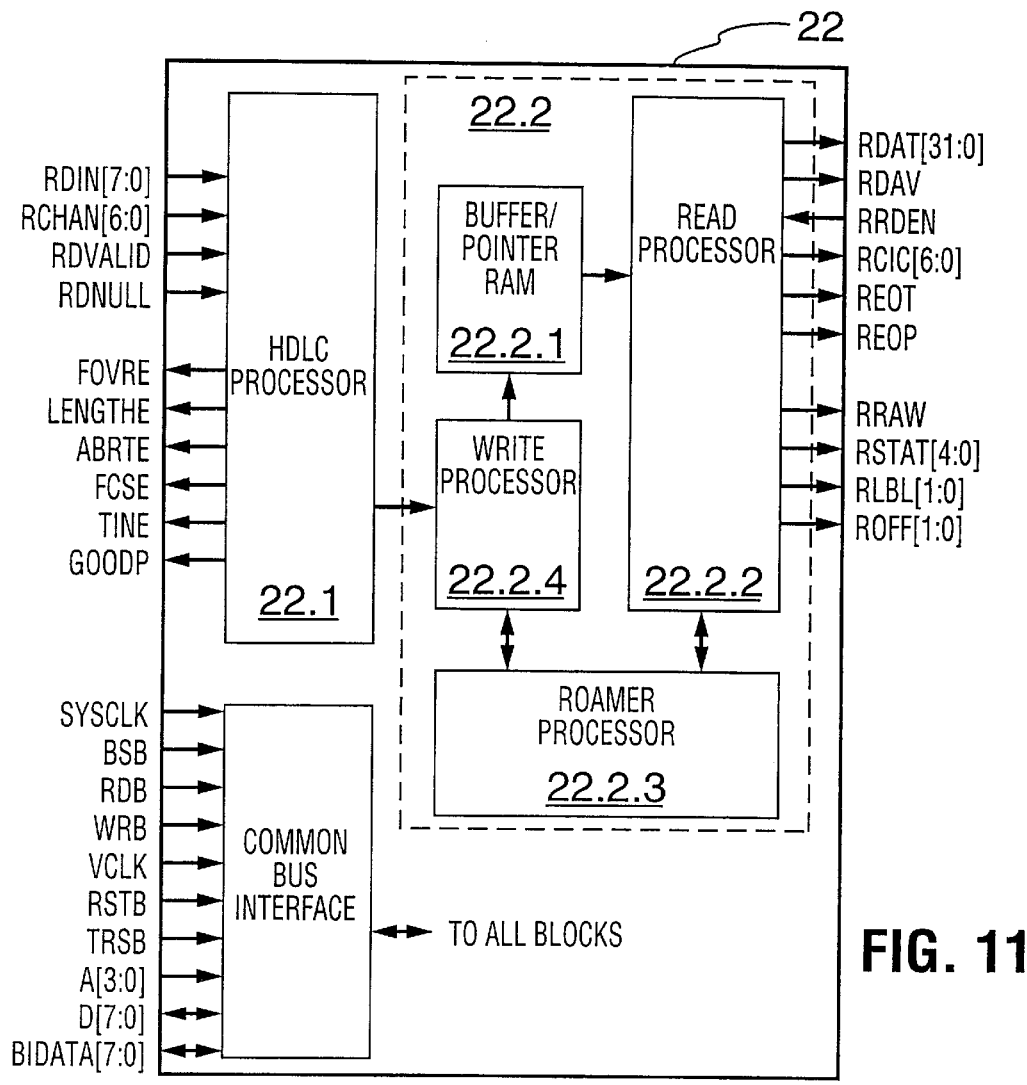
FIG. 11 is a block diagram illustrating an embodiment of the Receive HDLC Processor/Partial Packet Processor (RHDL) block in accordance with the present invention.

Referring to FIG. 11, incoming HDLC data streams from RCAS 20 are carried over the Receive HDLC data bus (RDIN[7:0]). All HDLC data streams are time-division multiplexed to form RDIN[7:0]. RDIN[7:0] is sampled on the rising edge of SYSCLK. The associated channel of the incoming HDLC data on RDIN[7:0] is identified on the Receive Channel bus (RCHAN[6:0]). The Receive Data Valid (RDVALID) signal reports when the incoming RDIN and RCHAN buses contain valid data. A null cycle on the receive HDLC interface is indicated with the Receive Null Data (RDNULL) signal.

RHDL 22 includes HDLC Processor 22.1 and Partial Packet Buffer Processor 22.2. HDLC Processor 22.1 is a time-sliced state machine which can be configured to perform data inversion, flag delineation, bit de-stuffing, CRC verification, and length monitoring for each channel data received from RCAS 20. In the embodiment illustrated in FIG. 11, HDLC Processor 22.1 can process up to 128 independent channels.

HDLC Processor 22.1 preferably implements the state machine from applicant's co-owned U.S. Pat. No. 5,640,398, entitled "STATE MACHINE ARCHITECTURE FOR CONCURRENT PROCESSING OF MULTIPLEXED DATA STREAMS", issued Jun. 17, 1997, the whole of which is hereby incorporated by reference (see FIG. 11A). In accordance with the state machine architecture of U.S. Pat. No. '398, processor 22.1 stores the state vector and provisioning information for each channel in associated memory locations in an internal RAM. In the embodiment illustrated in FIG. 11, the state vector for a particular channel may hold a number of parameters, including partially completed FCS calculation, partial packet octet residue caused by stuffing bit removal, an indication as to whether or not frame synchronization has been achieved and a running count of the length of the current packet being processed on the respective channel.

New channel data for a provisioned channel is received on RDIN[7:0]. As depicted in FIG. 11, when new channel data arrives from RCAS 22, processor 22.1 reads the associated state vector characteristic of the respective channel from RAM. The new channel data and the associated state vector are then presented to the state machine logic of processor 22.1 which, during one or more intermediate clock cycles, processes the new channel data and the associated state vector. Where the state vector indicates that frame synchronization has not been achieved for the respective channel, the new channel data is checked for flag sequences delineating the HDLC frames. When a frame (data packet) is detected, HDLC processor 22.1 bit de-stuffs the segment of the frame presented on RDIN and sends the resulting packet bytes to partial packet buffer processor 22.2 for storage in the appropriate channel FIFO buffer. The processed state vector is written back to its memory location for use in processing subsequent data segments for the same channel. In this way, processor 22.1 is thus able to process a data packet in non-contiguous segments, interleaved with data segments for data packets on other provisioned channels, while maintaining the current state of each channel in the respective state vectors. When the end of the frame is detected by processor 22.1 during the processing cycle in the state machine logic, the associated packet segment is labeled with CRC, octet alignment and frame length status. Where a channel is provisioned as transparent the HDLC data packet is passed by processor 22.1 to partial packet buffer 22.2 verbatim.

It will be noted that there is a natural precedence in the alarms detectable on a receive HDLC data packet. Once a packet exceeds a maximum programmable packet length, no further processing is performed on it by processor 22.1. Thus, octet alignment, FCS verification, and abort recognition are squelched on packets with a maximum length violation. An abort indication squelches octet alignment detection, minimum packet length violations, and FCS verification. Preferably, FCS verification is only performed on packets that do not have octet alignment errors, in order to allow the RHDL to perform CRC calculations on a byte-basis.

Figure 12:
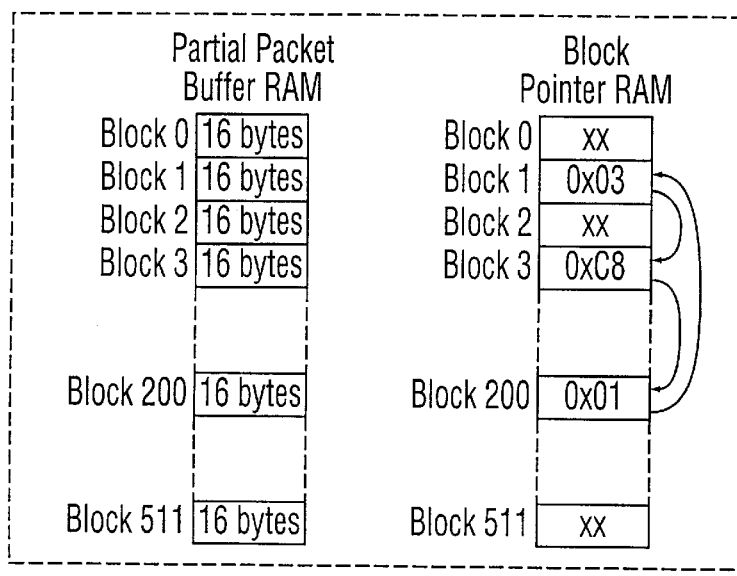
FIG. 12 is a diagram illustrating an embodiment of the partial packet buffer RAM and the block pointer RAM located in the RHDL in accordance with the present invention.

Referring to FIG. 11, Partial Packet Buffer Processor 22.2 controls packet RAM 22.2.1 which includes Partial Packet Buffer RAM and Block Pointer RAM. The Partial Packet Buffer RAM is divided into n-byte blocks and in the embodiment illustrated is an 8 Kbyte RAM divided into 16 byte blocks. Each n-byte block has an associated block pointer located in the Block Pointer RAM for addressing the next block in the linked list. Processor 22.2 uses block pointers to chain partial packet buffer blocks into circular linked lists, which serve as channel FIFO buffers. There is a channel FIFO buffer for each provisioned channel. Blocks of Partial Packet Buffer RAM are assigned to individual channel FIFOs. By way of example, FIG. 12 shows three blocks (1, 2 and 200) linked together with block pointers to form a 48 byte channel FIFO. When provisioning a channel FIFO, all respective block pointers are preferably re-written in order to initialize the FIFO. Advantageously, channel FIFOs can be configured to have different lengths, permitting device 10 to flexibly handle a wide range of load patterns. In this way, larger channel FIFOs can be dedicated to higher speed channels while slower speed channels can be provided with small channel FIFOs. Thus, device 10 is able to service a variety of links with different interface rates while maintaining quality of service across all links.

Referring to FIG. 11, Partial Packet Processor 22.2 includes three state machines: writer 22.2.4, reader 22.2.2 and roamer 22.2.3. Writer 22.2.4 is a time-sliced state machine which writes HDLC data and status information from the HDLC Processor 22.1 into an appropriate channel FIFO in the RAM 22.2.1. Reader 22.2.2 transfers channel FIFO data from the packet buffer RAM 22.2.1 to the downstream Receive DMA Controller (RMAC) block 24 over the receive packet data (RDAT[31:0]) bus. Data on RDAT[31:0] is considered valid when the receive data available (RDAV) signal is set high.

Roamer 22.2.3 is a time-sliced state machine which tracks channel FIFO buffer depths and signals the reader to service a particular channel. If a buffer channel over-run occurs, writer 22.2.4 ends the current packet from HDLC processor 22.1 in the respective channel FIFO with an over-run flag and ignores the rest of the packet.

In the embodiment illustrated, channel FIFOs are managed by partial packet buffer processor 22.2 on a transaction basis. Processor 22.2 tracks the number of transactions rather than the number of full blocks in a channel FIFO. A transaction is defined to include a number of full blocks of pre-determined size or an end-of-packet signal. A transaction is created when the partial packet writer 22.2.4 fills a transfer-sized number of blocks or writes an end-of-packet flag to the channel FIFO. A transaction is deleted when partial packet reader 22.2.2 transmits a transfer-size number of blocks or an end-of-packet flag to RMAC 24. Advantageously, small packets less than the transfer size will be transferred to RMAC block 24 without having to precisely track the number of full blocks in the channel FIFO.

Partial packet roamer 22.2.3 performs the transaction accounting for all channel FIFOs. Roamer 22.2.3 increments the transaction count when writer 22.2.4 signals a new transaction and sets a per-channel flag to indicate a non-zero transaction count. Roamer 22.2.3 searches the flags in a round-robin fashion to decide for which channel FIFO to request transfer by the RMAC block 24 and informs reader 22.2.2 of the channel to process. Reader 22.2.2 transfers the data to RMAC 24 until the channel transfer size is reached or an end-of-packet is detected. Reader 22.2.2 then informs roamer 22.2.3 that a transaction is consumed. The roamer 22.2.3 updates its transaction count and clears the non-zero transaction count flag if required. Roamer 22.2.3 then services the next channel having the transaction flag set high. In order to support multiple levels of priority, per-channel priority flags are used. For instance, where two levels of priority are provided, Roamer 22.2.3 first searches in a round-robin fashion those channel FIFOs with their respective priority flags set. Any requests to RMAC 24 for the higher priority channel FIFOs are serviced before the remaining channel FIFOs. If no high priority channel FIFOs require service, Roamer 22.2.3 proceeds with searching the low-priority flags from the last low priority channel FIFO serviced.

Writer 22.2.4 and reader 22.2.2 determine the empty and full FIFO conditions using flags. Each block in the partial packet buffer RAM has an associated flag. After a block is written, writer 22.2.4 sets the associated flag. Reader 22.2.2 clears the flag after the block is read. Flags are initialized when the block pointers are written using indirect block writes. Writer 22.2.4 declares a channel FIFO overrun if it tries to store data to a block with a set flag. In one preferable embodiment, in order to support optional removal of the FCS from the packet data, writer 22.2.4 does not declare a block as filled (set the block flag or increment the transaction count) until the first double word (DWORD) of the next block in the respective channel FIFO is filled. If the end of a packet resides in the first DWORD, writer 22.2.4 declares both blocks as full at the same time. When the reader 22.2.2 finishes processing a transaction, it examines the first double word of the next block for the end-of-packet flag. If the first double word of the next block contains only FCS bytes, reader 22.2.2 may optionally process the next transaction (end-of-packet) and consumes the block, as it contains information not transferred to the RMAC block.

Figure 13:
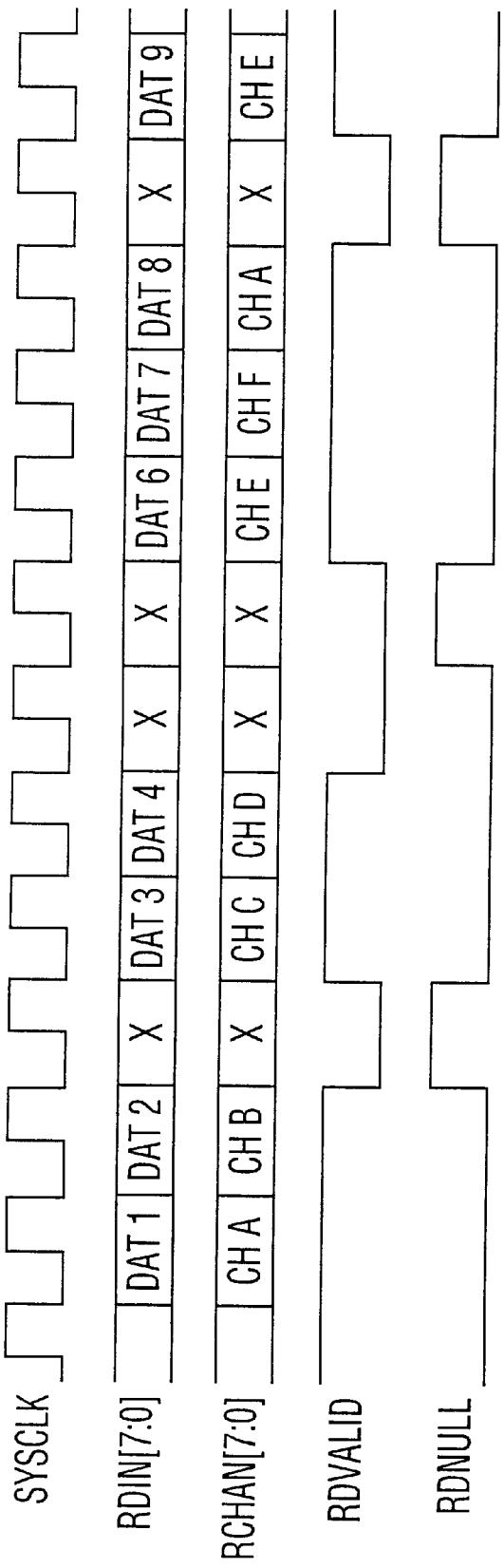
FIG. 13 is a timing diagram illustrating the timing for an incoming data stream at the RCAS/RHDL interface in accordance with the present invention.

Referring to FIG. 13, there is shown an illustration of the timing relationship of an incoming data stream at interface 21. The receive data in byte serial form is presented by RCAS 20 on RDIN[7:0]. The channel number of the data is provided on RCHAN[6:0]. The RDVALID signal indicates when valid data and a valid channel number arrives at the RHDL. As illustrated in FIG. 13, a data packet can be passed by RCAS 20 to RHDL 22 in data segments interleaved with data arriving on other provisioned channels, forming a time-sliced data pipeline on RDIN[7:0]. Null cycles, which are regularly scheduled invalid time slots, are identified by the RDNULL signal. In the embodiment illustrated data bytes from a particular channel are delivered by RCAS 20 at least 4 SYSCLK cycles apart from each other when sampled on RDIN[7:0], although the desired cycle pattern will vary with the selected implementation. Advantageously, null cycles in the receive section enable a host microprocessor to access the RAMs in the channel assigner 20.4 and partial packet processor 22.2 for channel configuration without the need for a further port.

Figure 14:
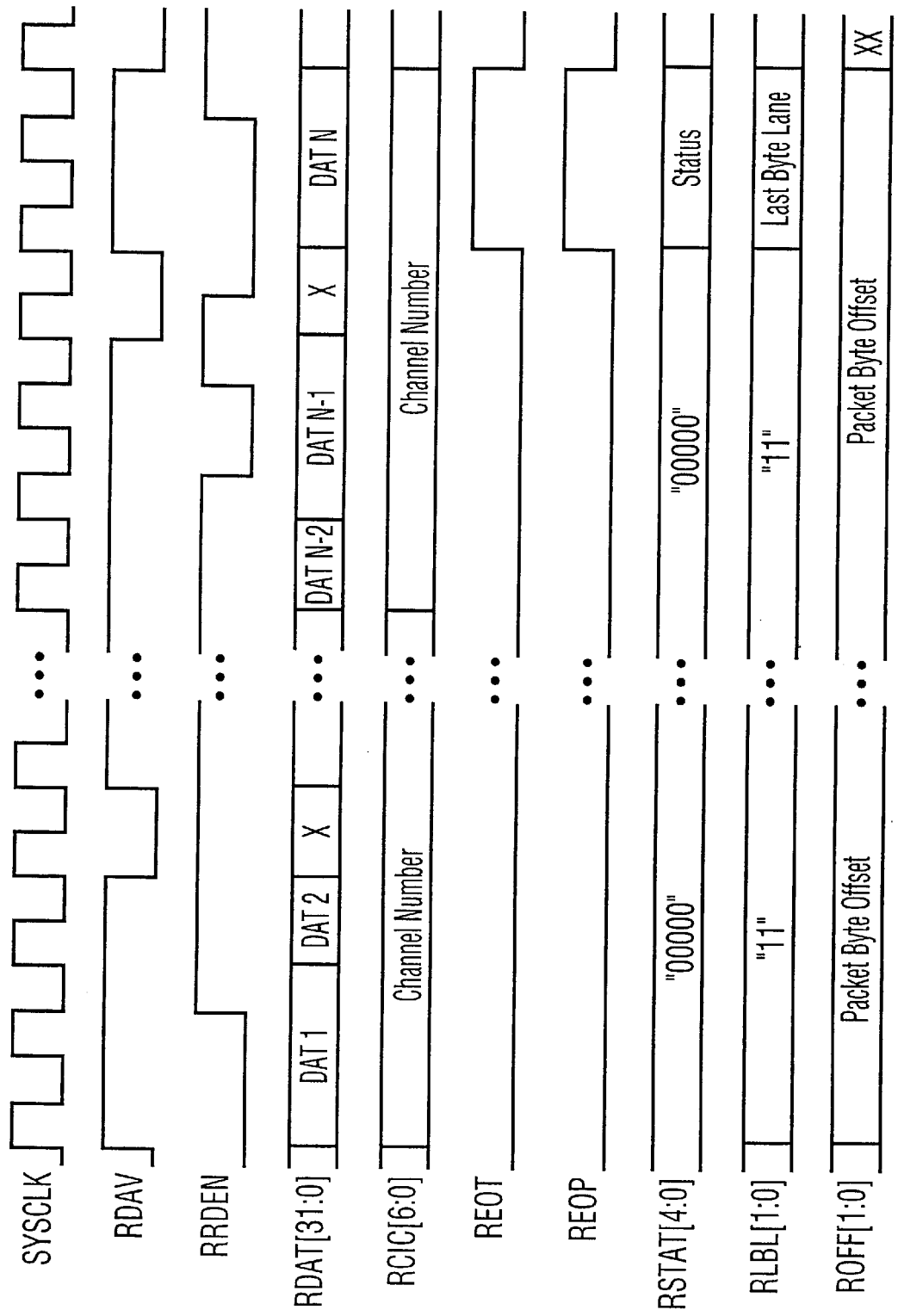
FIG. 14 is a timing diagram illustrating the timing for an outgoing data stream from the RHDL at the RHDL/RMAC interface in accordance with the present invention.

Referring to FIG. 14, for data transfer from RHDL 22 to RMAC 24, RHDL 22 controls the flow of data using the RDAV signal. Valid data is presented on the RDAT[31:0] bus when RDAV is asserted. In the embodiment illustrated, downstream logic in RMAC 24 can control the flow of data using the receive read enable (RRDEN) signal. If RRDEN and RDAV are both asserted, data on RDAT[31:0] will be deemed to have been sampled by downstream logic on the next rising clock edge. RHDL 22 then supplies a new word of data or deasserts RDAV on the following clock cycle. If RRDEN is asserted and RDAV is deasserted, no action is taken. If RRDEN is deasserted and RDAV is asserted, data on RDAT[31:0] is held over to the next clock cycle by RHDL 22.

The receive end of transfer (REOT) signal is asserted when the last data word of a transfer is present on RDAT [31:0]. At this time, the receive end of packet (REOP) signal and the receive status (RSTAT) signals become valid and receive last byte lane (RLBL[1:0]) changes to indicate the byte lane containing the last data byte.

RECEIVE-SIDE DMA MANAGEMENT

Referring to FIG. 4, packet data from RHDL block 22 are received by Receive DMA Controller (RMAC) block 24 which stores the data in data buffers in host computer memory. RMAC 24 is not directly connected to the host memory PCI bus, rather, memory accesses are serviced by downstream PCI controller block GPIC 26. RMAC 24 communicates with the host using Receive Packet Descriptors (RPD) which are used to manage the transfer of data packets to the host. RPDs contain the size and location of data buffers in host memory and the data packet information associated with the data in each buffer. RPDs are referenced by RMAC 24 and the host using Receive Packet Descriptor References (RPDRs) which are used to index a table of RPDs.

Figure 15:
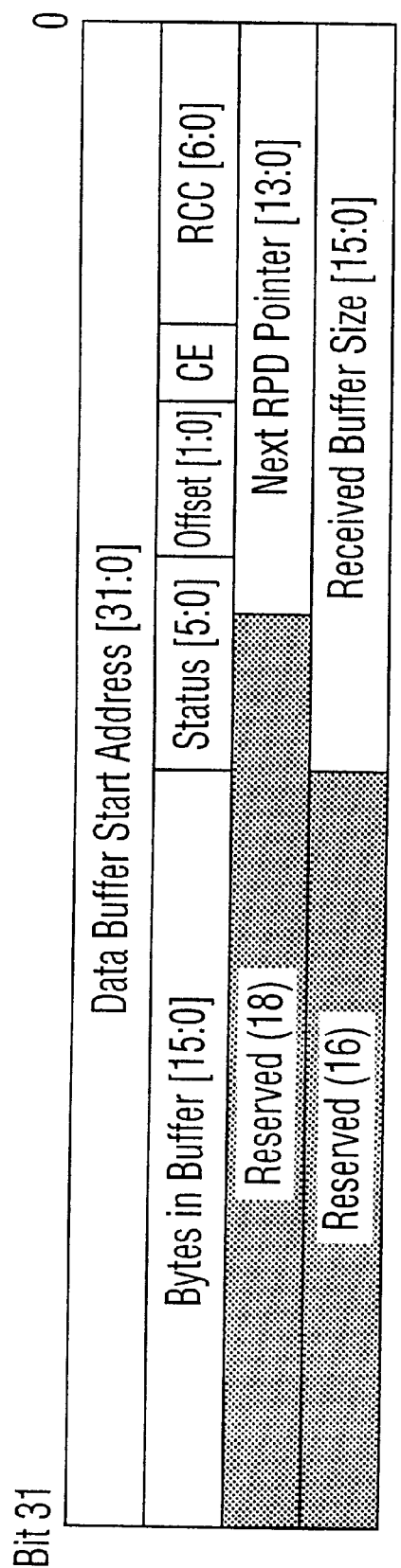
FIG. 15 is a diagram illustrating an embodiment of a data structure used to define a Receive Packet Descriptor (RPD) in accordance with the present invention.

Referring to FIG. 15, there is shown the data structure for an RPD. The Data Buffer Start Address[31:0] bits point to the start address in the host data buffer where the associated data packet is stored. Receive Channel Code (RCC[6:0]) bits are used by RMAC 24 to indicate the channel to which an RPD is associated. The Chain End (CE) bit indicates the end of a linked list of RPDs. When CE is set to logic one, the current RPD is the last RPD of a linked list of RPDS. When CE is set to logic zero, the current RPD is not the last in a linked list of RPDS. The Offset[1:0] bits indicate the byte offset of the referenced data packet from the start of the relevant host data buffer. If Offset is non-zero, there are dummy bytes at the start of the data buffer prior to the packet data proper. The dummy bytes are inserted prior to the packet data by RHDL 22. Each channel can be programmed independently to have 0 to 3 dummy bytes inserted at the start of each HDLC packet. This advantageously permits the pre-pending of header data to a packet (as part of higher level protocol processing) without requiring the HDLC packet to be moved in memory. The Status field is used to indicate the status of the received packet. The Bytes in Buffer[15:0] field indicates the number of bytes actually used to store packet data in the host data buffer referenced by the current RPD. For the embodiment illustrated, the count in the Bytes in Buffer field excludes dummy bytes inserted in the data buffer as a result of a non-zero Offset field. The Next RPD Pointer (NRP) field is used to store an RPDR which enables RMAC 24 to support linked lists of RPDs. The NRP field contains the RPDR to the next RPD in a linked list. RPDs are linked by RMAC 24 when more than one data buffer is needed to store a packet. The Receive Buffer Size field contains the size in bytes of the data buffer in host memory associated with the current RPD.

Figure 16:
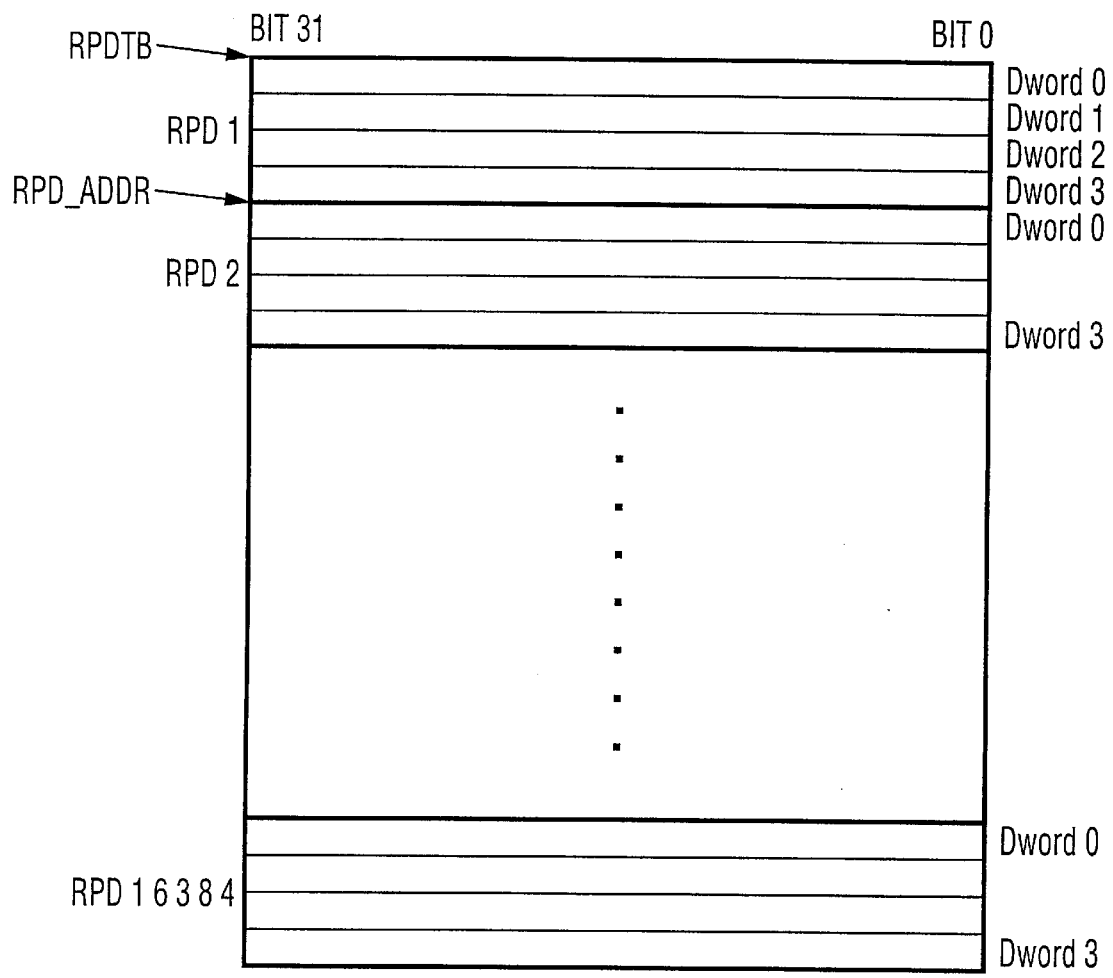
FIG. 16 is a diagram illustrating an embodiment of the Receive Packet Descriptor Table in accordance with the present invention.

Referring to FIG. 16, RPDs are preferably stored in host memory in a Receive Packet Descriptor Table (RPDT). In the embodiment illustrated, the RPDT can contain up to 16384 RPDs. The base address of the RPDT is stored in the receive packet descriptor table base (RPDTB) register in RMAC 24. The RPDT table is indexed with a Receive Packet Descriptor Reference (RPDR) which in FIG. 16 is illustrated as a 14-bit pointer defining the offset of an RPD from the RPDT base address. A particular RPD is located by adding the RPDR index value to the base address for the RPD table stored in the RPDTB register.

Figure 17:
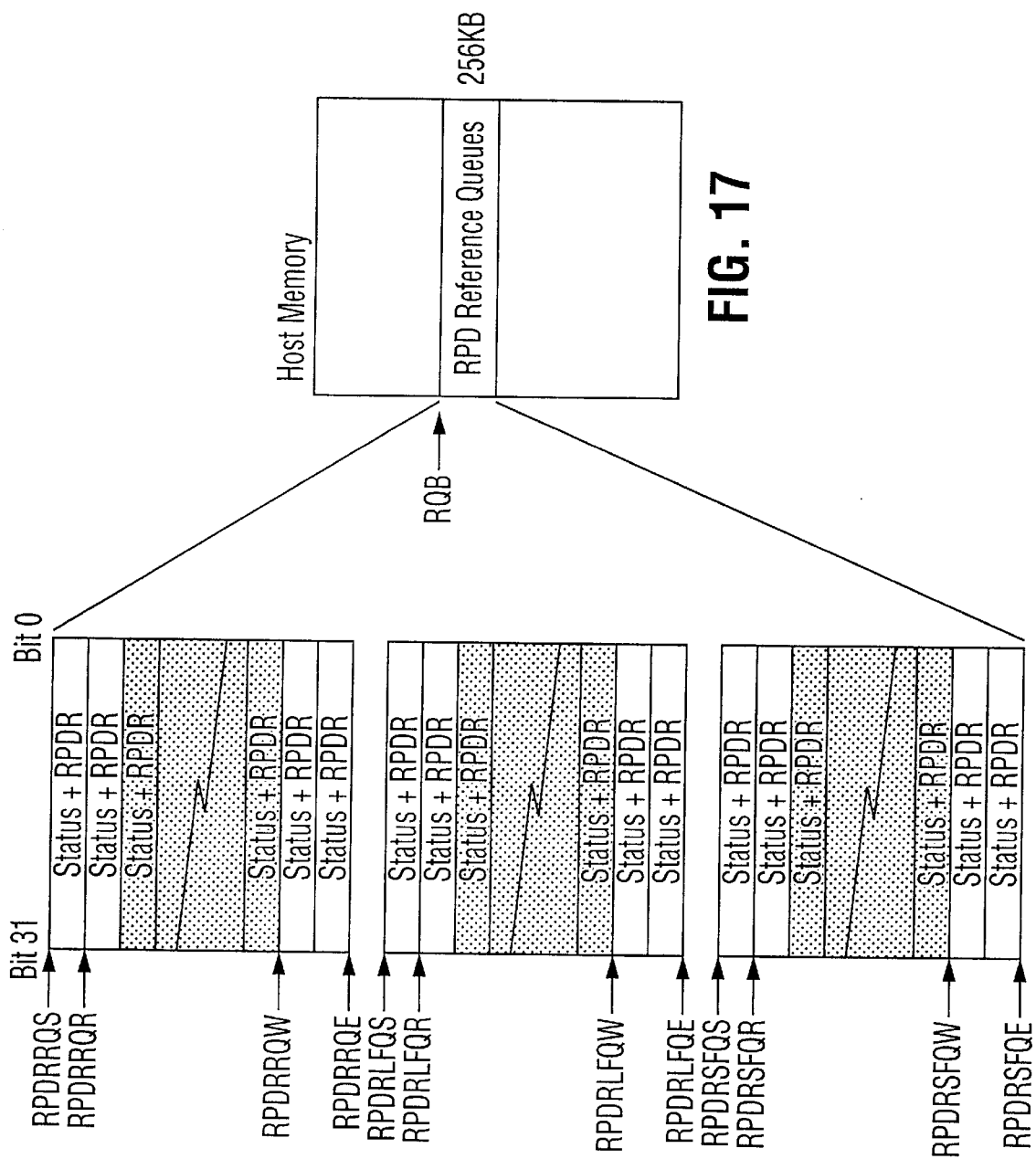
FIG. 17 is a diagram illustrating the memory map for the receive packet queues referenced by the Receive DMA Controller in accordance with the present invention.
Figures 18, 19:
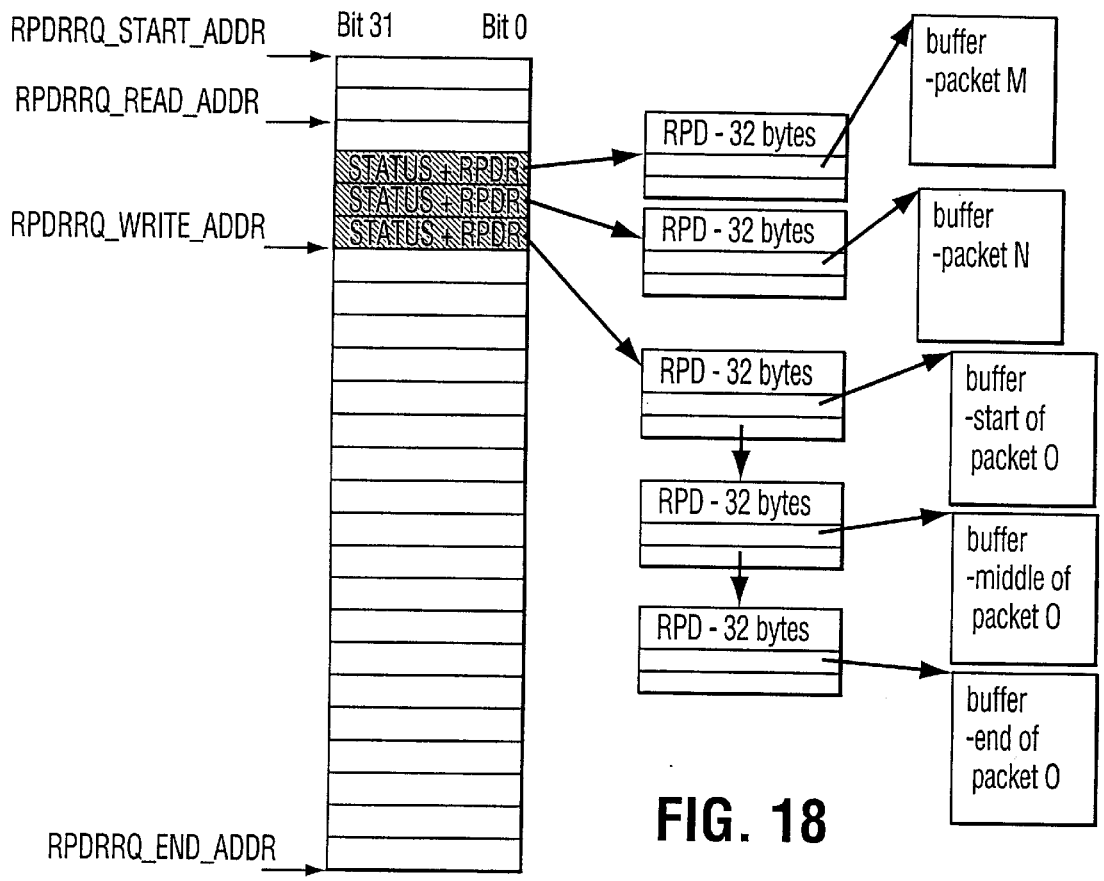
FIG. 18 is a diagram illustrating an embodiment of the Receive Packet Descriptor Reference Ready Queue with RPDRs referencing RPD chains located in host memory as contemplated in the present invention.
FIG. 19 is a diagram illustrating an embodiment of the Receive Channel Descriptor Reference Table in accordance with the present invention.

Referring to FIG. 17, RPDRs are accessed by RMAC 24 and the host using receive packet queues. For the embodiment illustrated, three queues are provided: RPDR Large Buffer Free Queue (RPDRLFQ), RPDR Small Buffer Free Queue (RPDRSFQ) and RPDR Ready Queue (RPDRRQ). The free queues contain RPDRs which reference RPDs in the RPDT that define free data buffers available in the host. The ready queue contains RPDRs which reference RPDs that define data buffers which are ready for host processing. RMAC 24 pulls RPDRs from the free queues when it needs free data buffers to store a packet (or segments of a packet) arriving on RDIN[31:0]. RPDs for a particular packet are chained together into a linked list by RMAC 24 with the Next RPD Pointer fields. RMAC 24 places the RPDR associated with the first RPD in the chain on the ready queue (RPDRRQ) after it has filled the necessary buffers with data for a packet, as illustrated in FIG. 18. RPDRs are removed from the ready queue by the host for processing of the data buffers. Once the host is finished reading the data from the buffers, it places the RPDRs back on the respective free queues.

Receive packet queues preferably reside in host memory and are defined by a Receive Queue Base (RQB) register and index registers which reside in RMAC 24. RQB is the base address for the receive packet queues. In the embodiment illustrated, each packet queue has four index registers which define the start and end of the queue and the read and write locations of the queue. Each index register is 16-bits in length and defines an offset from the RQB. Thus, the address of an RPDR is calculated by adding the relevant index register to the RQB register. RQB and the index registers are initialized by the host. When an entity (RMAC 24 or the host) removes elements (RPDRs) from a queue, the entity updates the associated read pointer (read index register) for that queue. When an entity places elements onto a queue, the entity updates the write pointer (i.e. the associated write index register) for that queue.

The read index for each queue (RPDRxR, where x=LFQ, SFQ or RQ) references the last valid RPDR read in the associated queue. The write index for each queue (RPDRxW, where x=LFQ, SFQ, and RQ) references where the next RPDR can be written in the respective queue. The start index for each queue (RPDRxS) points to the first valid location within the queue. The end index (RPDRxE) points to the end of the respective queue. A queue is empty when the read index is one less than the write index, or when the read index is one less than the end index and the write index equals the start index. A queue is full when the read index is equal to the write index.

Preferably, when processing a packet, RMAC 24 first pulls an RPDR which references a small buffer RPD from the RPDR Small Buffer Free Queue in order to store the data packet. If the HDLC packet requires more than one buffer, RMAC 24 then uses large buffer RPDs by pulling RPDRs from the RPDR Large Buffer Free Queue to store the remainder of the packet. While implementing the queuing system in this way is not required, doing so has the advantage of minimizing both the average number of RPDRs consumed for each packet and, more significantly, minimizing the amount of processor intervention which arises when handling packet management on a plurality of channels.

Figure 20:
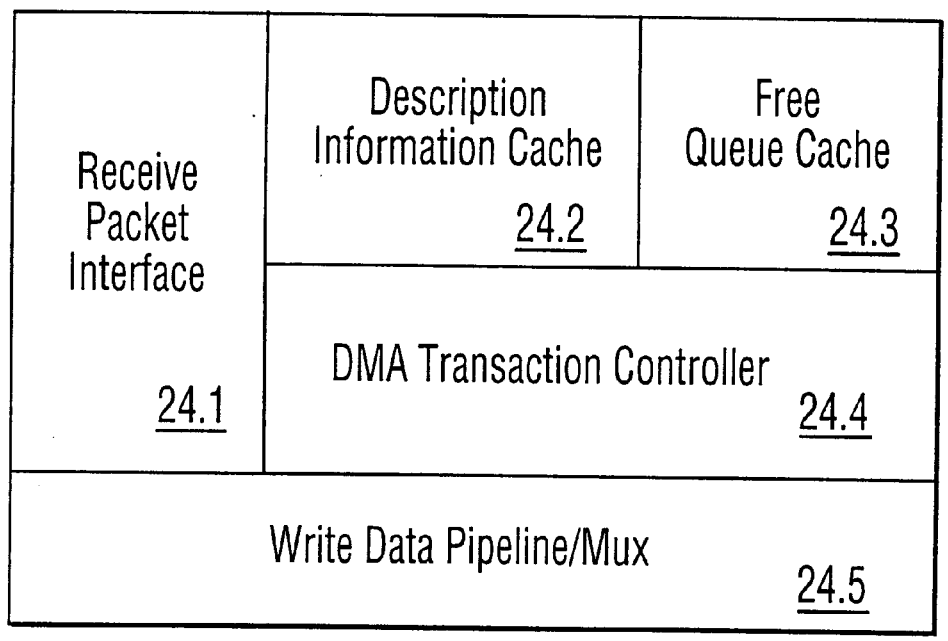
FIG. 20 is a diagram illustrating an embodiment of the Receive DMA Controller (RMAC) block architecture in accordance with the present invention.

Referring to FIG. 20, RMAC 24 includes DMA Transaction Controller 24.4, Write Data Pipeline/Mux 24.5 and Descriptor Information Cache 24.2. DMA Transaction Controller 24.4 coordinates the reception of data packets from the Receive Packet Interface 24.1 and their subsequent storage in host memory data buffers. Using the RPDs and the Receive Channel Descriptor Reference Table (see FIG. 19), RMAC 24 can receive a packet over a number of separate transactions, interleaved with transactions belonging to other channels. In such transactions, segments of a packet can be transmitted in linked blocks of data. Transaction Controller 24.4 also maintains RPDs and RPD queues. Write Data Pipeline/Mux 24.5 pipelines receive data between RHDL 22 and the GPIC block 26, inserting enough delay to enable DMA Transaction Controller 24 to generate appropriate control signals at the GPIC interface. Write Data Pipeline/Mux 24.5 furthermore provides a multiplexer to the data out lines on the GPIC interface allowing DMA Transaction Controller 24.4 to output data relating to transactions initiated by Controller 24.4.

RMAC 24 caches information concerning each channel in a Receive Channel Descriptor Reference Table (RCDRT) which is stored internally in Descriptor Information Cache 24.2 in order to decrease the number of host bus accesses required to process each data packet. The RCDRT for the 128 channel embodiment of the present invention is shown in FIG. 19. Three DWORDs of information are stored for each channel. The Bytes Available in Buffer field is used to keep track of the number of bytes available in the current data buffer. The RBC field is used to track the number of data buffers which are being used to store non packet delimited (i.e. "raw") data. RMAC 24 initializes the RBC field to a predetermined value RAWMAX. RBC is decremented each time a buffer is filled with data. If the field is zero when a buffer is filled, the chain of RPDs is placed on the ready queue and a new chain is started. The RPD Pointer field contains the RPDR to the current RPD. The Buffer Size field contains the size in bytes of the buffer currently being written to. The V field is used to indicate that a packet is currently being received on the associated channel. When V is set to 1, the other fields in the RCDRT entry for the associated RCC are valid. The Start RPD Pointer field contains the RPDR pointer to the first RPD for the packet being received from the RHDL. The DMA Current Address field holds the host address of the next DWORD in the current buffer.

RMAC 24 preferably includes Free Queue Cache 24.3 which implements an M element RPDR Small Buffer Free Queue cache and an M element RPDR Large Buffer Free Queue cache. Caching RPDRs from the free queues in RMAC 24 reduces the number of host accesses that are required. Elements of each cache are consumed one at a time as required by RMAC 24. A cache is reloaded when RMAC 24 requires a new small buffer or large buffer RPDR and the associated cache is empty. If less than M new elements are available or if the reader pointer index for the associated free queue is within M elements of the end of the end of the queue, fewer than M elements may be loaded into a cache.

PERIPHERAL CONTROL INTERCONNECT CONTROLLER

Referring to FIG. 4, General-Purpose Peripheral Component Interconnect Controller (GPIC) block 26 bridges the timing domain (SYSCLK) of the DMA controllers (RMAC and TMAC) on the receive and transmit sides of device 10 and the timing domain of the PCI bus master (PCICLK). In the embodiment illustrated, GPIC 26 provides a 32 bit Master and Target interface core which contains the control functions for compliance with the conventions of Peripheral Component Interconnect (PCI) Bus Revision 2.1, although it will be appreciated that other peripheral component interconnect standards may be used with the present invention.

Figure 21:
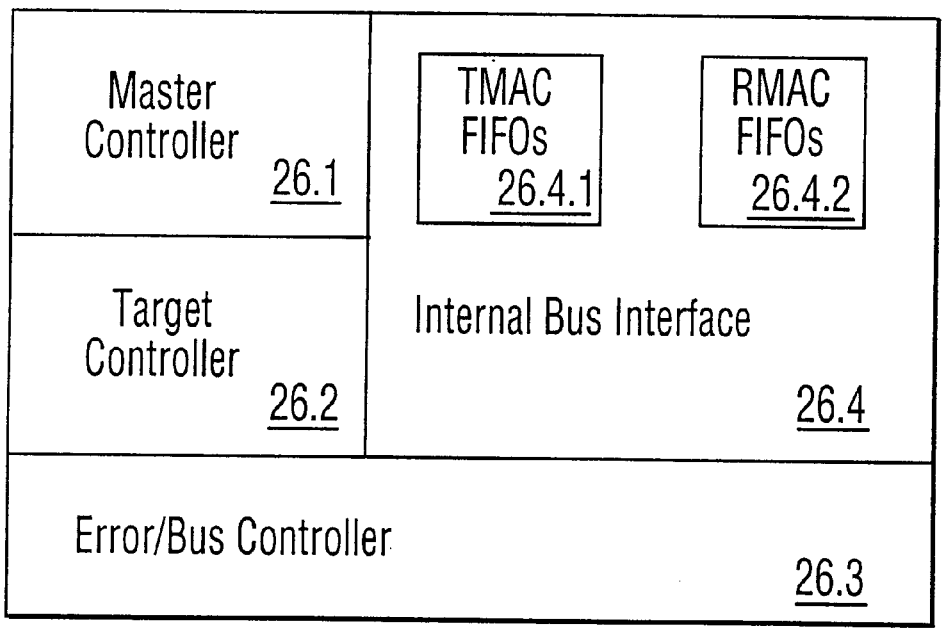
FIG. 21 is a diagram illustrating an embodiment of the General-Purpose Peripheral Component Interconnect Controller (GPIC) block in accordance with the present invention.

Referring to FIG. 21, GPIC 26 has four sections: master state machine 26.1, target state machine 26.2, internal microprocessor bus interface 26.4 and error/bus controller 26.3.

Master state machine 26.1 translates requests from RMAC 24 and TMAC 28 interfaces into PCI bus transactions. Master 26.1 initiates four types of PCI transactions: memory read, memory read line, memory read multiple and memory write. The number of data transfers in any cycle is controlled by the associated RMAC 24 or TMAC 28.

Requests for control over the PCI bus are made using the REQB signal. GPIC 26 arbitrates for control of the PCI bus in response to RMAC 24 or TMAC 28 requesting a cycle. Before asserting the PCI request line (REQB), GPIC 2 6 performs an internal arbitration to determine the priority of service in the event that both RMAC 24 and TMAC 28 are requesting service. GPIC 26 temporarily buffers data from RMAC 24 or TMAC 28 while it is arbitrating for control of the PCI bus. GPIC 26 provides four FIFO buffers: RMAC read, TMAC read, RMAC write and TMAC write. Requests from the FIFOs are arbitrated on either an RMAC priority or on a round-robin basis.

The active low PCI bus grant signal (GNTB) is used to indicate the granting of control over the PCI bus in response to a bus request via the REQB output. When an external PCI bus arbitrator issues a GRANT in response to a REQUEST from GPIC 26, master state machine 26.1 monitors the PCI bus to ensure that the previous master (initiator) has completed its transaction and has released the bus before beginning the cycle. When the FRAMEB signal is sampled high, no current transactions are in progress and GPIC 26 proceeds with the new transaction. Once GPIC 26 has control of the PCI bus, it will assert the FRAMEB signal and drive the bus with the address and command information for the new transaction. Address information is provided by the selected DMA controller.

The PCI address and data bus (AD[31:0]) carries the PCI bus multiplexed address and data. During the first clock cycle of a transaction, AD[31:0] contains a physical byte address (referred to as the address phase). During subsequent clock cycles of a transaction, AD[31:0] contains data (referred to as the data phase(s)). After the initial data transfer, GPIC 26 tracks internally the address for all remaining transfers in the burst in case GPIC 26 is disconnected and must retry the transaction.

During burst reads from host memory, data is written directly into the associated read FIFO in GPIC 26 where RMAC 24 or TMAC 28 can remove the data at its own rate. During burst writes to host memory, GPIC 26 will typically begin requesting the PCI bus for a write transaction shortly after data starts to be loaded into the appropriate write FIFO by RMAC 24 or TMAC 28. GPIC 26 terminates a transaction early if the associated FIFO empties before completion of the transaction (referred to here as data starvation) and will initiate a further transaction to write the remaining data when it becomes available.

For packet data writes initiated by RMAC 24, GPIC 26 delays requesting control of the PCI bus until the associated write FIFO has filled up with a number of DWORDS equal to a programmable threshold. In this way, fewer PCI transactions are required for each transfer across GPIC 26 of data from the channel FIFOs in RMAC 24 and to the channel FIFOs in TMAC 28, thereby enabling GPIC 26 to communicate more efficiently with the PCI bus. If the associated write FIFO empties without reaching the end of the transaction, GPIC 26 terminates the current transaction and starts a new transaction to transfer any remaining data when the RMAC 24 signals an end of transaction. By initiating a PCI transaction before all data is in the write FIFO, GPIC 26 advantageously reduces the impact of bus latency on core device 10.

Communications between the PCI bus and the DMA controllers (RMAC 24 and TMAC 28) are made through one of two synchronous FIFO interfaces which form part of internal bus interface 26.4. FIFO interface 26.4.1 is dedicated to servicing TMAC 24 and includes the TMAC read and write FIFOs. FIFO interface 26.4.2 is dedicated to servicing RMAC 28 and includes the RMAC read and write FIFOs. Transfers on each of the RMAC and TMAC interfaces are timed to the associated SYSCLK rate. Defining the data path with two FIFO interfaces provides a mechanism to segregate the system timing domain of device 10 from the external PCI bus master.

Target state machine 26.2 performs all the required functions of a stand alone PCI target device. Target machine 26.2 controls the protocol of PCI target accesses to GPIC 26 and provides all PCI configuration registers.

Preferably, GPIC 26 maximizes data throughput between the PCI bus and device 10 by paralleling local bus data transfers with PCI access latency.

Referring to FIG. 22, an example of a PCI burst read transaction cycle is shown. The illustrative cycle is valid for target and initiator (master) accesses through GPIC 26. During Clock 1, the initiator drives FRAMEB to indicate the start of a cycle. The initiator also drives the address onto the AD[31:0] bus and drives the C/BEB[3:0] lines with the read command. For Clock 1, the IRDYB (initiator ready), TRDYB (target ready) and DEVSELB (device select) signals are in turnaround mode, as identified with the 'T'. When in turnaround mode, no agent is driving the associated signal for the relevant clock cycle. During Clock 2, the initiator ceases to drive the AD[31:0] bus in order that the target can drive it in the next cycle. The C/BEB[3:0] lines are also driven by the initiator for Clock 2 with byte enables for the read data. IRDYB is driven active by the initiator to indicate it is ready to accept the data transfer. During Clock 3, the target claims the transaction by driving DEVSELB active. The target also places the first data word onto the AD[31:0] bus and drives TRDYB to indicate to the initiator that the data is valid. During Clock 4, the initiator latches in the first data word and the target negates TRDYB to indicate to the initiator that the data is valid. During Clock 5, the target places the second data word onto the AD[31:0] bus and drives TRDYB to indicate to the initiator that the data is valid. During Clock 6, the initiator latches the second data word and negates IRDYB to indicate to the target that it is not ready for the next transfer. During Clock 7, the initiator asserts IRDYB to indicate to the target it is ready for the third data word. FRAMEB is negated to indicate the last transfer in the transaction. During Clock 8, the initiator latches in the last word and negates IRDYB. The target, having seen FRAMEB negated in the last clock cycle, negates TRDYB and DEVSELB.

An example of a PCI burst write transaction on the GPIC PCI bus interface is illustrated in FIG. 23. The transaction cycle is valid for target and initiator accesses through GPIC 26. The initiator drives FRAMEB to indicate the start of a transaction cycle during Clock 1. The physical byte address and the write command are driven by the initiator on AD[31:0] and C/BEB[3:0] respectively. During Clock 2, the initiator starts driving the first data word on AD[31:0] and drives C/BEB[3:0] with byte enables for the write data. The target claims the transaction by driving DEVSELB and drives the TRDYB line to indicate to the initiator that it is ready to accept the data. In the subsequent clock cycles, Data 1, 2 and 3 are passed to the target on the AD[31:0] bus.

TRANSMIT-SIDE DMA MANAGEMENT

Referring to FIG. 4, in the transmit direction, Transmit DMA Controller (TMAC) block 28 receives packet data from the host computer memory for transmission over a selected physical link. TMAC 28 communicates with the host computer PCI bus through bus interface 26.4 in GPIC 26. TMAC 28 uses bus interface 26.4 whenever it needs to initiate a host bus read or write. TMAC 28 communicates with the host using Transmit Descriptors (TDs). TDs contain the size and location of buffers in host memory and the packet status information associated with the data in each buffer.

Referring to FIG. 24, there is shown the data structure for a TD. Data Buffer Start Address[31:0] bits point to the start address in host memory where the associated data packet is stored. The Bytes in Buffer[15:0] field is used by the host to indicate the total number of bytes to be transmitted in the current TD. In a two level quality of service scheme, the Priority (P) bit is set by the host to indicate the priority of the associated packet. Packets with the P bit set high are queued in a high priority queue in TMAC 28. Packets with the P bit set low are queued in the low priority queue. The V bit is used to indicate that the TMAC Next TD Pointer field is valid. The More (M) bit is used by the host to support packets that require multiple TDs. The Chain End (CE) bit is used to indicate the end of a linked list of TDs presented to the TMAC. The Transmit Channel Code (TCC[6:0]) field is used by the host to identify the channel to which a TD is associated. The TMAC Next TD Pointer is used to store a TDR for the creation of linked lists of TDs. The Host Next TD Pointer is used to permit the host to support linked lists of TDs. The Transmit Buffer Size field is used to indicate the size in bytes of the data buffer for the current TD.

Figure 25:
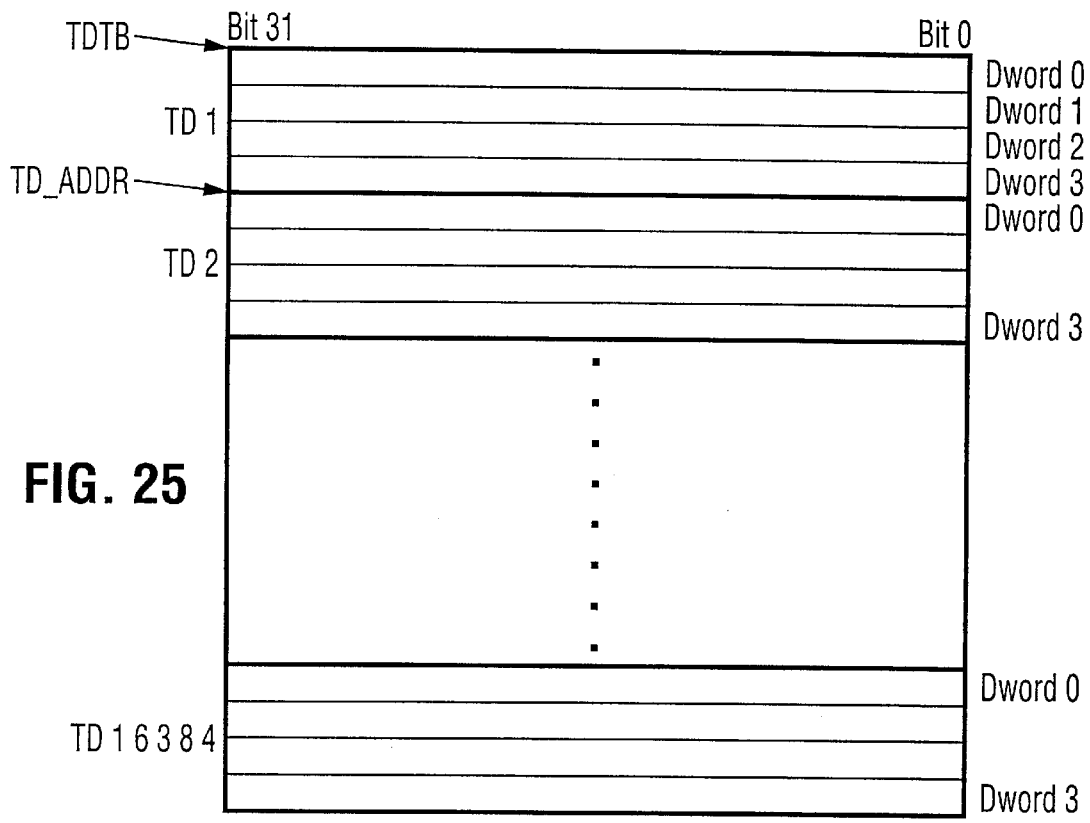
FIG. 25 is a diagram illustrating an embodiment of the Transmit Descriptor table in accordance with the present invention.

Referring to FIG. 25, as with RPDs, TDs are preferably stored in host memory in a Transmit Descriptor Table (TDT). In the embodiment shown, the TDT can hold up to 16384 TDs. TDs are referenced by TMAC 28 and the host using Transmit Descriptor References (TDRs) which are used to index the TDT. A selected TD is located by adding the TDR offset value to the base address for the TDT (TDTB) stored in a register in TMAC 28.

Figure 26:
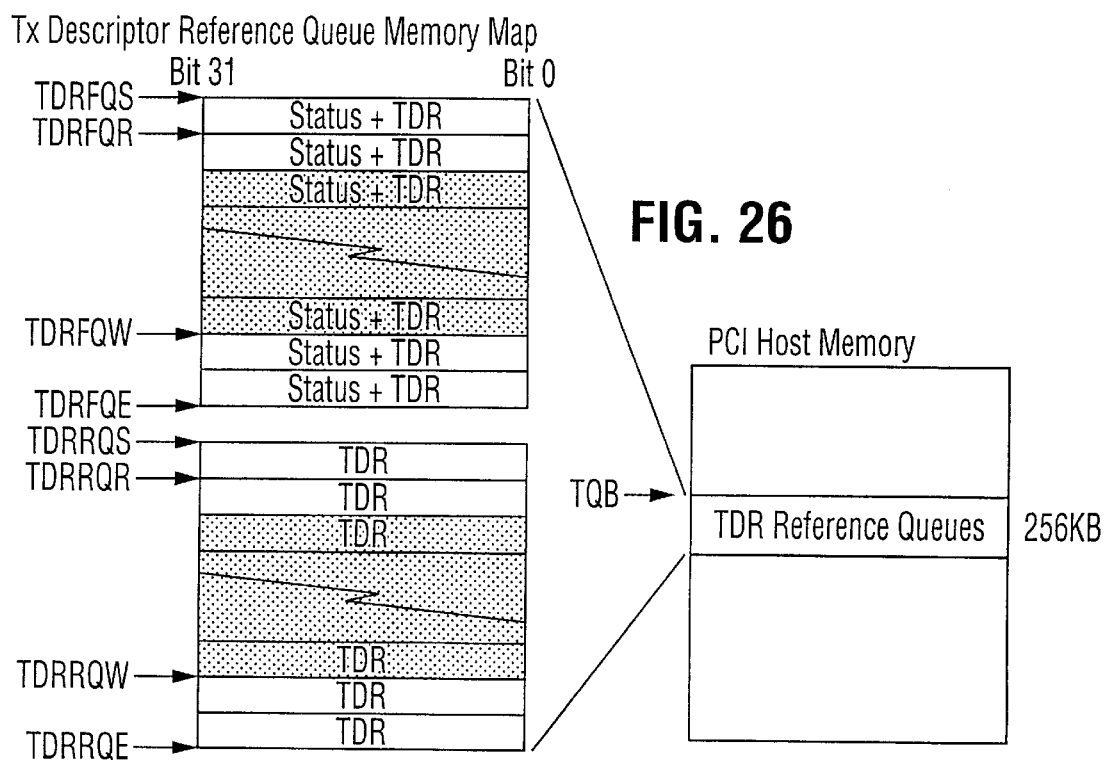
FIG. 26 is a diagram illustrating the memory map for the transmit queues referenced by the TMAC in accordance with the present invention.

Referring to FIG. 26, TDRs which reference TDs containing packet(s) ready for transmission are passed from the host to TMAC 28 using a Transmit Descriptor Reference Ready (TDRR) queue. In the embodiment shown, the TDRR queue resides in host memory. TDRs which reference TDs whose data buffers have been read by TMAC 28 are passed to a Transmit Descriptor Reference Free (TDRF) queue which also resides in host memory.

The TDRR and TDRF queues are defined by a common base pointer residing in a Transmit Queue Base (TQB) register and four offset pointers for each queue stored in registers which reside in TMAC 28. For each queue, two pointers define the start and end of the queue and two pointers track the current read and write locations within the queue. TDRxQR (x=F or R) provides the offset value for locating the last TDR read in the associated free and ready queues and TDRXQW (x=F or R) provides the offset value in the respective free and ready queue for locating where the next TDR can be written. A location in a queue is referenced by adding the relevant offset to TQB.

Referring to FIG. 27, TMAC 28 includes DMA Transaction Controller 28.4, Read Data Pipeline 28.5, and Descriptor Information Cache 28.2. Transaction Controller 28.4 coordinates the processing of requests from THDL 30 with the reading of data stored in host memory. Advantageously, using the TDs and the TCDR table discussed below (see FIG. 28), Transaction Controller 28.4 is able to handle a diverse range of traffic patterns, including the transmission of a data packet in data segments (and blocks of data segments) over a number of separate host memory transactions, interleaved with transactions for other channels. Transaction Controller 28.4 furthermore initiates read and write transactions to GPIC 26 for the purposes of maintaining TDR queues and TDs.

Read Data Pipeline 28.5 inserts delay in the data stream between GPIC 26 and THDL 32 to enable DMA Transaction Controller 28.4 to generate appropriate control signals at the Transmit Packet Interface 28.1. In the embodiment illustrated, TMAC 28 includes Free Queue Cache 28.3 which provides a 6 element TDR Free Queue cache so as to reduce the number of host bus accesses made by TMAC 28.

Transaction Controller 28.4 maintains a Transmit Channel Descriptor Reference (TCDR) table in Descriptor Information Cache 28.4 for caching information relating to DMA activity on each channel together with TDRs which are used by Transaction Controller 28.4 to sort packet chains supplied by the host into per-channel linked lists.

Referring to FIG. 28, there is shown the TDCR table for an embodiment of the invention having 128 channels. In the example shown, eight DWORDs of information are stored for each channel (comprising two sets of four DWORDS for each of two priority levels). The M and CE fields hold copies of the values of the M bit and CE bit respectively for the TD currently being read on the associated channel (TCC x, x=0 . . . 127). For channelized communication, the A bit is used to indicate whether or not a channel is active (i.e. provisioned). Several fields are included in the embodiment illustrated in FIG. 28 to manage the linked lists for each channel and priority level. The Last TD Pointer field is used to hold the offset to the head of the last host-linked chain of TDs to be read. The Current TD Pointer field is used to store the offset to the TD currently being read. The D field indicates whether or not the linked list of packets for the current channel and priority level is empty. If the D bit is set to logic 1, the list is not empty and the Current TD Pointer field points to a valid TD. A copy of the Host Next TD Pointer field for the TD currently being read is stored in the Host TD Pointer. The V bit is used to indicate whether or not the linked list of packets for the current channel and priority level contain more than one host-linked chain. The Next TD Pointer field holds the offset value to the head of the next host-linked chain of TDs to be read.

In addition, each the TDCR table includes a DMA Current Address field for each channel and priority level which holds the address of the next DWORD in the current data buffer where packet data is located. This field is incremented on each access to the data buffer. The Bytes to Tx field is used to indicate the total number of bytes that remain to be read in the current buffer. Each access to the data buffer decrements this value. Further, in order to provide for prioritized transmission, the Packet Transfer in Progress bit is included to indicate the priority level of the packet currently being transmitted on the respective channel.

The TCDR table includes fields which are used by TMAC 28 to construct linked lists of data packets for transmission. After a head TDR referencing a chain of data packets is placed on the TDRR queue by the host, TMAC 28 retrieves the head TDR and links it to the TD pointed to by the Last TD Pointer field for the associated channel and priority level, thereafter updating the Last TD Pointer field to reference the new end-of-chain location. In this way, TMAC 28 uses the TDRs to sort the associated packet chains into linked lists which are organized according to the TCDR table on a per-channel and per-priority level basis. For the embodiment illustrated, TMAC 28 can create up to 256 separate linked lists based on the associated channels with a high and low priority list for each channel. It will be appreciated, of course, that any number of linked lists may be created using the TCDR table for a selected implementation. When a new data packet is requested by the THDL 30 downstream for a particular channel, TMAC 28 picks a packet (or the portion thereof currently available) from the associated high-priority linked list unless it is empty, in which case TMAC 28 accesses the associated low-priority linked list.

Implementing the TCDR table illustrated has two important advantages. First, caching DMA-related information in the TCDR table reduces the number of host bus accesses required to process each data packet which is to be transmitted. Furthermore, using the TCDR table enables TMAC 28 to sort packet chains supplied by the host into per-channel linked lists. Sorting data packets according to per-channel linked lists provides a significant advantage over prior art devices which use a single queue to transmit packets. In such previous schemes, data is read in sequential order out of the single queue. Where multiple channels require service, a single channel is serviced until a whole packet is sent before one of the remaining waiting channels can be serviced, resulting in a degradation in network performance. This problem is known as head-of-line blocking. Moreover, with a single queue, as one increases the number of channels supported, the likelihood that a request for service for a particular channel will correspond to the current data in the queue decreases. In the multi-channel encoder/decoder in the present invention, which is capable of concurrently handling links of different rates, head-of-line blocking can have a significant impact on performance. The problems posed by head-of-line blocking are solved by sorting TDs into per-channel linked lists using the TCDR table (although as depicted in the embodiment shown, the this may be further improved by also organizing the linked lists on a per-priority level basis).

Figure 29:
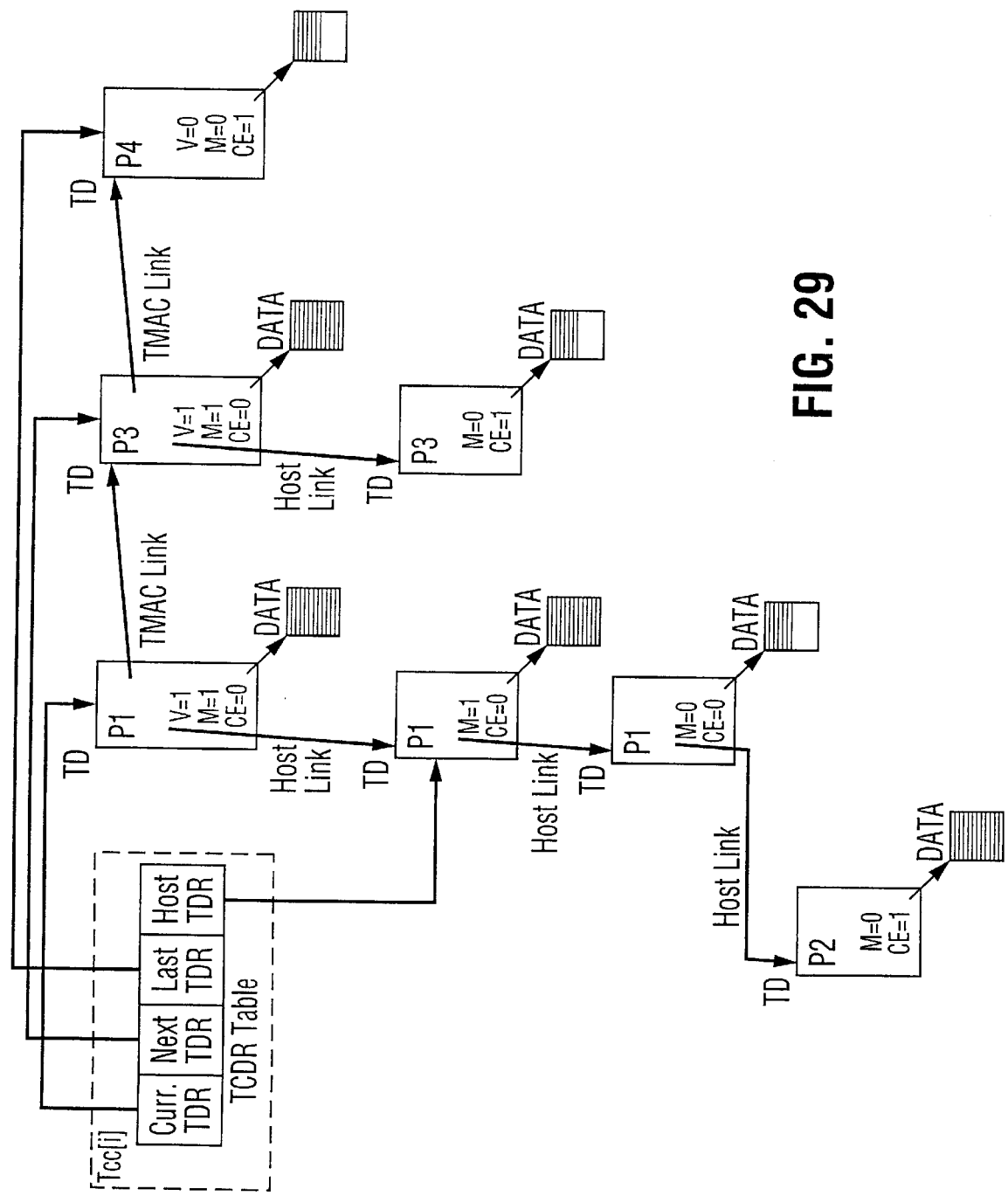
FIG. 29 is a diagram illustrating the link list structure for a channel in the TCDR Table in accordance with the present invention.

Referring to FIG. 29, there is shown an example of a linked list attached to a selected TCC (TCC[i]) in the TCDR table. The head of the list (Curr TDR) contains a host-linked list of four TDs referencing corresponding data buffers having two data packets P1 and P2. Appended to the head by TMAC 28 (TMAC link) is a host-linked list of two TDs referencing corresponding data buffers for data packet P3. A further TMAC link is shown appending a single TD referencing a corresponding data buffer containing data packet P4. As illustrated, using the TCDR table TMAC 28 can append chains of packet data to the linked list corresponding to a channel while maintaining the incoming pattern of data chains. In the case of a number of links with different rates, this enables TMAC 28 to link chains of packets according to the demands imposed by the various link rates.

In order to maintain a steady flow of data through device 10, Transaction Controller 28.4 performs a number of tasks concurrently. In the embodiment illustrated, top priority is given to servicing expedited read requests from THDL 30. Second priority is given to removing chains of data packets from the TDR ready queue and attaching them to the appropriate per-channel linked list. Third priority is given to servicing non-expedited read requests from THDL 30.

TRANSMIT-SIDE HDLC PROCESSING AND PARTIAL PACKET BUFFERING

Figure 30:
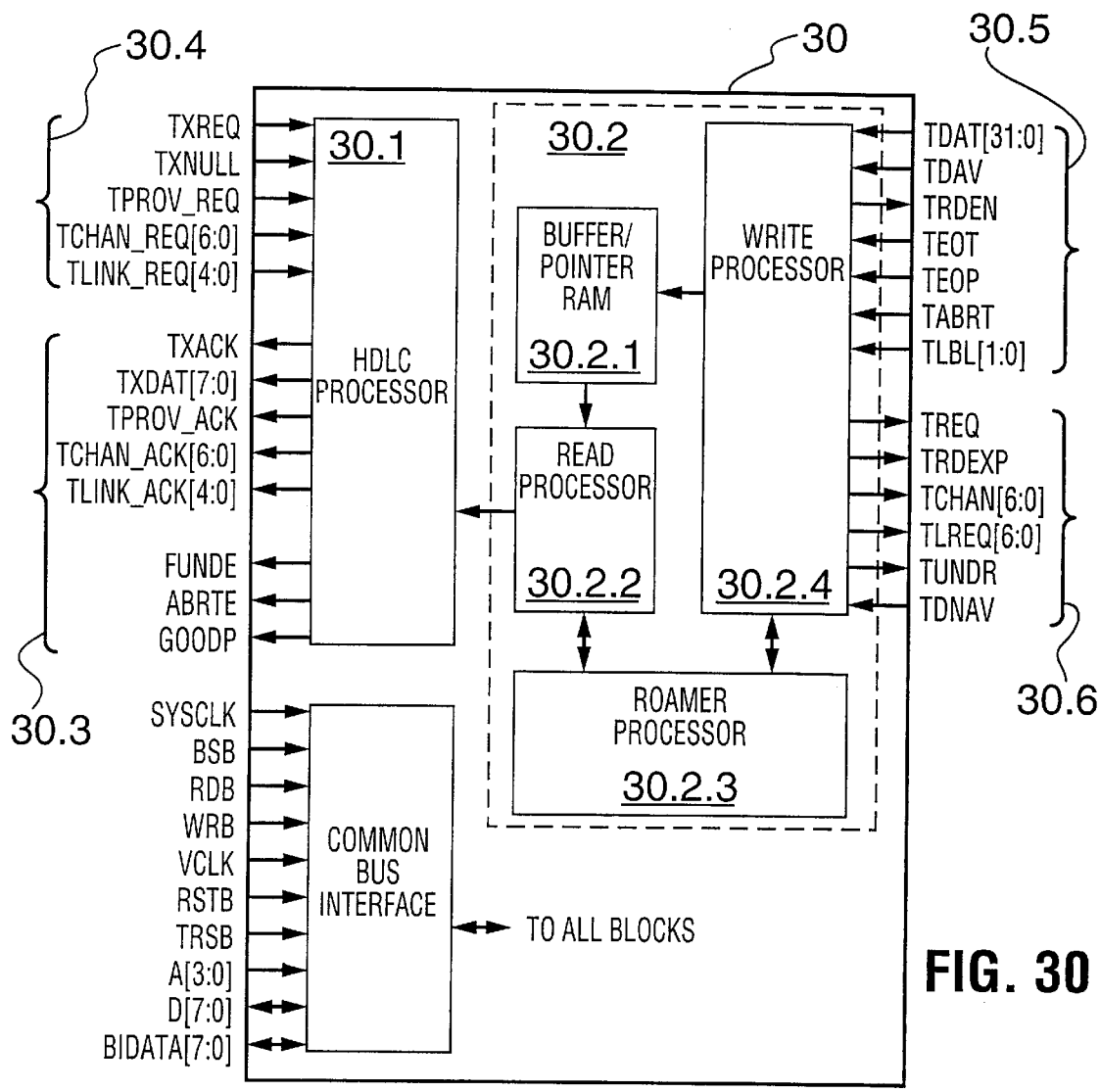
FIG. 30 is a diagram illustrating an embodiment of the Transmit HDLC Processor/Partial Packet Processor (THDL) block in accordance with the present invention.

Referring to FIG. 30, complete and partial packets retrieved from the host memory by TMAC 28 are transmitted to the Transmit HDLC Processor/Partial Packet Buffer Processor (THDL) block 30 where they are stored in channel specific FIFOs in Partial Packet Buffer Processor 30.2. When the amount of data in a channel FIFO reaches a programmable threshold, HDLC Processor 30.1 is enabled to initiate transmission on Transmit HDLC Acknowledge Interface 30.3.

HDLC Processor 30.1 is a time-slice state machine which can be configured to perform flag insertion, bit stuffing, CRC generation and data inversion. As with RHDL 22, HDLC Processor 30.1 implements the state machine from applicant's co-owned U.S. Pat. No. 5,640,398, although for both of processors 30.1 and 22.1, it will be appreciated that other prior art state-machine implementations may be used. HDLC Processor 30.1 requests data from Partial Packet Buffer Processor 30.2 when a request for channel data arrives on the Transmit HDLC Request Interface 30.4 from TCAS 32. As data is delivered by processor 30.2 from the respective channel FIFO and is processed by HDLC Processor 30.1, the appropriate state vector characteristic of the respective channel is read, processed and written back into internal RAM within processor 30.1. In the embodiment illustrated, processor 30.1 can process up to 128 independent channels, although the number of channels will vary with the desired implementation.

Figure 32:
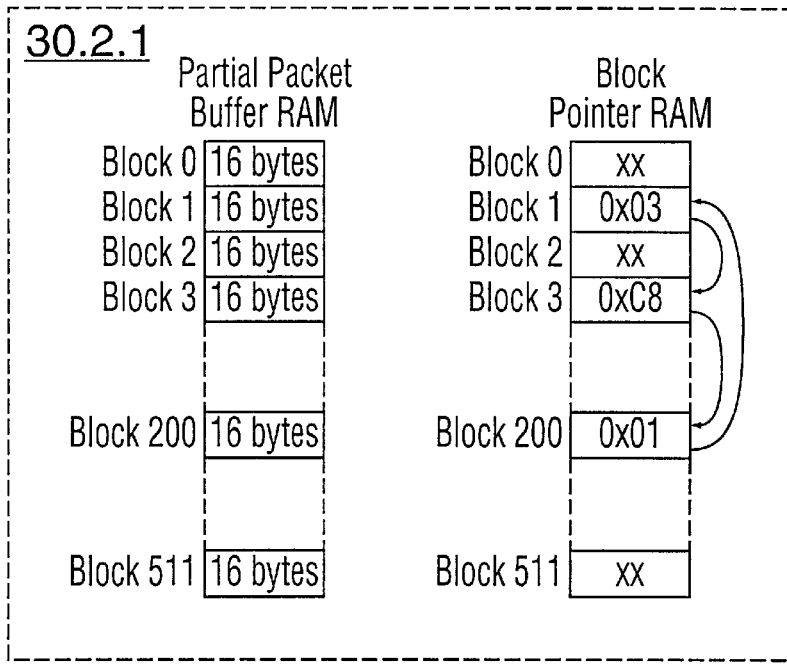
FIG. 32 is a diagram illustrating an embodiment of the Partial Packet Buffer RAM and the Block Pointer RAM of the THDL Partial Packet Buffer Processor in accordance with the present invention.

Partial Packet Buffer 30.2 controls RAM 30.2.1 which comprises Partial Packet Buffer RAM and Block Pointer RAM. In the embodiment shown, Partial Packet Buffer RAM is an 8 Kbyte RAM divided into 16 byte blocks. Block pointers from Block Pointer RAM are used to chain partial packet buffer blocks into circular linked lists which act as channel FIFO buffers, as shown in FIG. 32. As discussed for RHDL 22, channel FIFOs in RAM 30.2.1 can be configured to have variable lengths so as to enable device 10 to adapt to the load patterns of an arrangement of links with varying data rates.

Referring to FIG. 30, Partial Packet Buffer Processor 30.2 includes three state machines: writer 30.2.4, reader 30.2.2, and roamer 30.2.3 which together manage the channel FIFOs of RAM 30.3.1. Writer 30.2.4 is a time-slice state machine which transfers packet data received on the Transmit DMA Acknowledge Interface 30.5 to the associated channel FIFO in RAM 30.2.1. Reader 30.2.2 is a time-slice state machine which transfers HDLC packet data from a channel FIFO in RAM 30.2.1 to HDLC Processor 30.1 in response to requests from Processor 30.1. Roamer 30.2.3 is a time-slice state machine which tracks the free space of each channel FIFO and signals writer 30.2.4 to service a particular channel.

Writer 30.2.4 and reader 30.2.2 determine FIFO conditions using flags. Each block in the Partial Packet Buffer RAM has an associated flag. Writer 30.2.4 sets the associated flag after a block is written. Reader 30.2.2 clears a flag after the associated block is read. Reader 30.2.2 declares a channel FIFO under-run whenever it tries to read data from a block without a flag set and reports the FIFO under-run to roamer 30.2.3 for error handling.

For the embodiment illustrated, channel FIFOs in RAM 30.2.1 are handled based on a per-channel transfer size and per-channel free space trigger levels. Instead of tracking the number of full blocks in a channel FIFO, partial packet processor 30.2 tracks the number of empty blocks, referred to here as free space, as well as the number of end of packets stored in the FIFO. This reduces the amount of information which needs to be stored for FIFO management. In one embodiment, partial packet processor 30.2 monitors free space and the number of end-of-packets for each FIFO buffer with a free space counter and an end-of-packet counter for each FIFO.

Roamer 30.2.3 records FIFO free space and end-of-packet count for all channel FIFOs. Roamer 30.2.3 increments FIFO free space when reader 30.2.2 signals that a block has been read and sets a per-channel request flag when the free space is greater than a pre-determined transfer size limit. Roamer 30.2.3 also decrements the end-of-packet count when reader 30.2.2 signals that it has passed an end of a packet to HDLC Processor 30.1. If HDLC Processor 30.1 is transmitting a packet and FIFO free space is greater than a pre-determined free space limit and the end-of-packet count is equal to zero, a per-channel expedite flag is set. Roamer 30.2.3 searches the expedite flags in a round robin fashion to decide which channel FIFO should make expedited data requests to TMAC 28 on Transmit DMA Request Interface 30.6 If no expedite flags are set, roamer 30.2.3 searches the request flags in a round-robin fashion to decide which channel FIFO should make regular data requests to TMAC 28. Roamer 30.2.3 informs writer 30.2.4 of the channel FIFO to process and the type of request it should make. Writer 30.2.4 sends a request for data to TMAC 28 and writes the incoming data to the channel FIFO and sets the associated block flags. Writer 30.2.4 reports back to roamer 30.2.3 the number of blocks used and the presence of a transferred end-of-packet. Roamer 30.2.3 decrements FIFO free space by the number of blocks used and increments the end-of-packet count if one is present.

Referring to FIG. 30, the transmit request signal (TXREQ) identifies valid request cycles on the transmit request port. The transmit request provisioned signal (TPROV_REQ) is used to identify request cycles for provisioned channels. The channel number for a request is carried on the transmit channel request identifier bus (TCHAN_REQ[6:0]). The link number of a request is carried on the transmit link request identifier bus (TLINK_REQ[4:0]).

Figure 31:
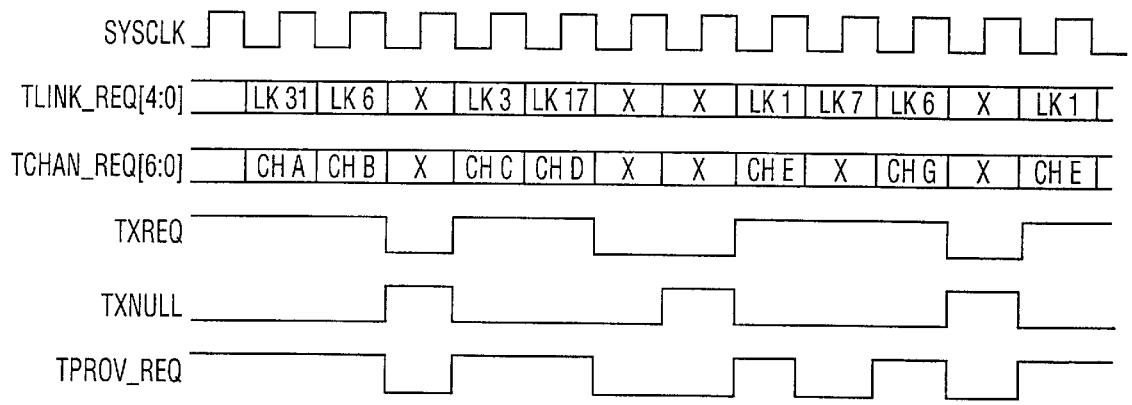
FIG. 31 is a timing diagram illustrating the timing for the Transmit HDLC Request Interface in accordance with the present invention.

Referring to FIG. 31, there is shown an example of the timing relationship at the Transmit HDLC Request Interface 30.4 (see FIG. 30). Inputs TXREQ, TXNULL, TPROV_REQ, TLINK_REQ[4:0] and TCHAN_REQ[6:0] are sampled on the rising edge of SYSCLK. TXREQ sampled high indicates a valid request for information. If TPROV_REQ is high, the data request is for a downstream provisioned channel, otherwise the data request is for an unprovisioned channel and TCHAN_REQ[6:0] is invalid. For example, the request for LK7 is for an unprovisioned channel. Null cycles are identified by TXNULL sampled high. It will be noted that the channel/link pairing in FIG. 31 is one of many possible arrangements. It is also possible for more than one channel to share a link. FIG. 31 shows a case where channels CH B and CH G share link LK6. It should be noted that in the embodiment illustrated, data requests for a particular channel are delivered by TCAS 30 at least four SYSCLK cycles apart from each other when sampled on TCHAN_REQ[6:0], although this parameter will vary with the selected implementation.

Figure 33:
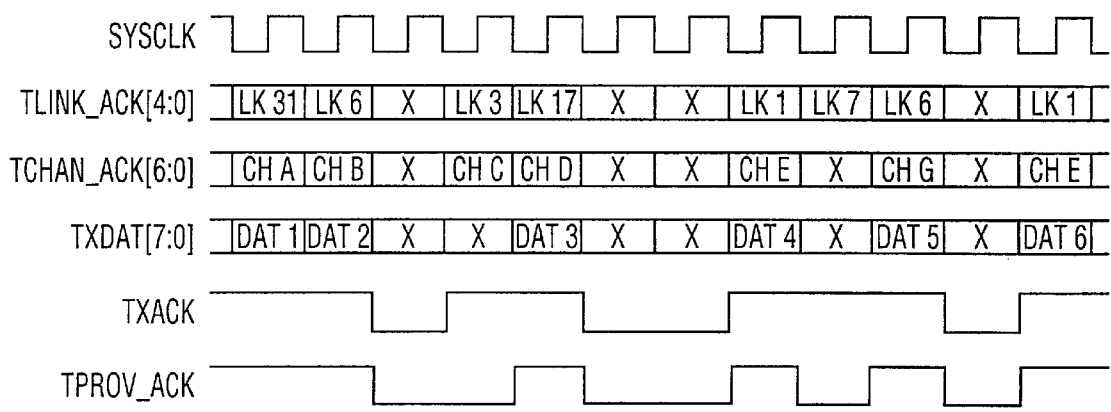
FIG. 33 is a timing diagram illustrating the timing for the Transmit HDLC Acknowledge Interface in accordance with the present invention.

Referring to FIG. 33, there is shown an illustration of the Transmit HDLC Acknowledge timing relationship. Outputs TXACK, TPROV_ACK, TXDATA[7:0], TCHAN_ACK[6:0] and TLINK_ACK[4:0] are updated on the falling edge of SYSCLK. TXACK is set high during a valid acknowledgment and low during filler time-slots. TPROV_ACK is set high if the channel is provisioned by HDLC Processor 30.1 and the incoming request on TPROV_REQ was sampled high. When TPROV_ACK is high, the output data TXDATA[7:0] is valid. In the example in FIG. 33, the acknowledgment for link LK3 does not contain valid HDLC data because the HDLC Processor 30.1 has not been provisioned for this channel.

Referring to FIG. 30, requests by THDL 30 for data from TMAC 28 are made on Transmit DMA Request Interface 30.6. Requests for packet data are initiated using the transmit request (TREQ) signal. A data transfer is requested by the Partial Packet Processor 30.2 by asserting TREQ for one SYSCLK cycle. As previously discussed, in the embodiment illustrated TMAC 28 typically prioritizes its tasks such that reading TDRs from its ready queue and sorting them into linked lists has a higher priority than servicing requests from THDL 30. However, urgent requests from THDL 30 can be indicated with the transmit read expedited (TRDEXP) signal which, when asserted, reverses this priority. The TRDEXP line can be used to indicate that at least one channel FIFO in Partial Packet Processor 30.2 is below a minimum threshold and should be serviced as soon as possible. The channel associated with the current data request is indicated on the transmit channel number (TCHAN[6:0]) bus. The number of bytes of data requested is indicated on the transmit length request (TLREQ[6:0]) bus. The transmit channel FIFO under-run (TUNDR) is used to indicate when a FIFO for a channel specified by TCHAN[6:0] has under-run.

Figure 38:
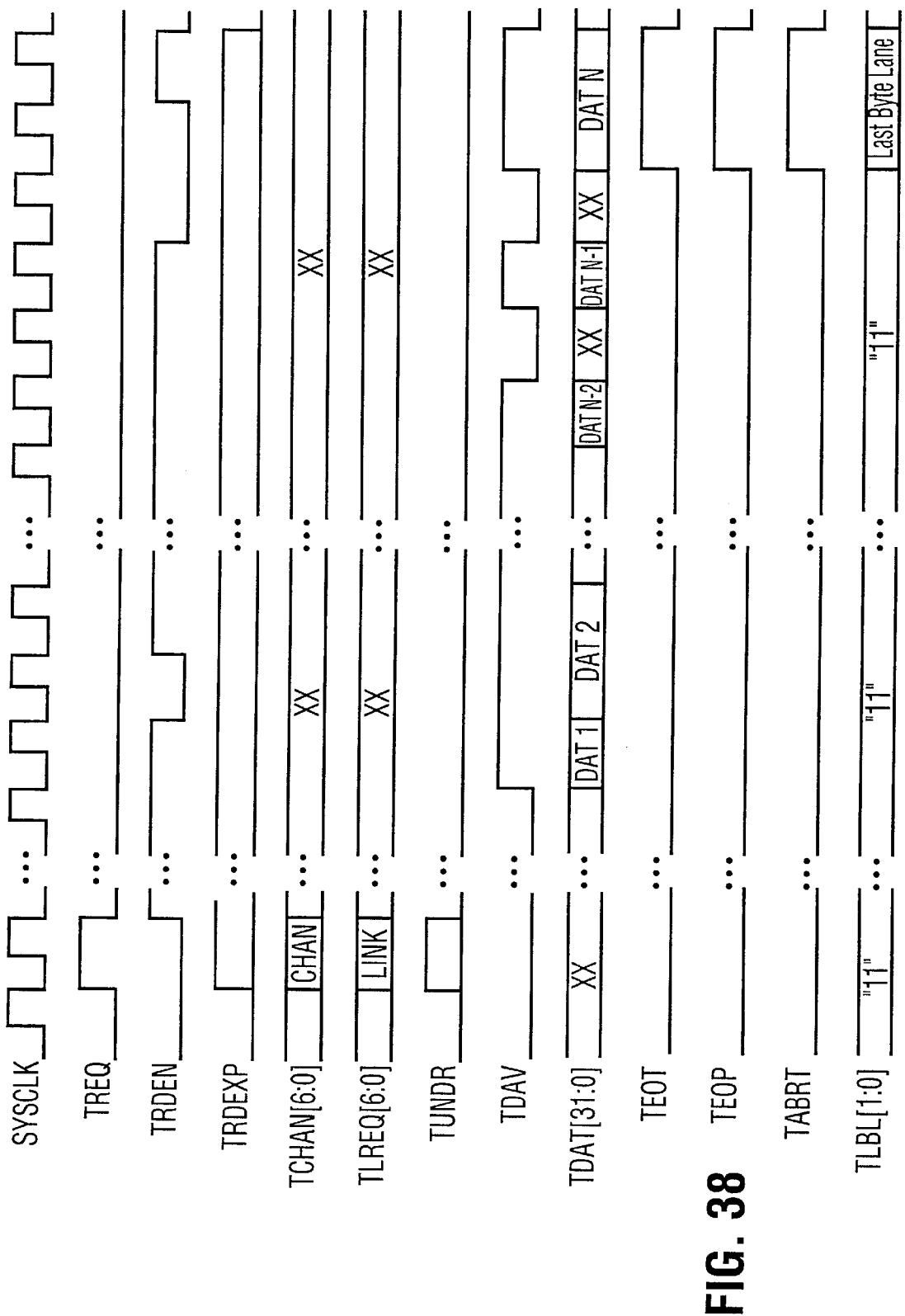
FIG. 38 is a timing diagram illustrating the timing for the Transmit DMA Acknowledge Interface and the Transmit DMA Request Interface in the THDL.

Requests by THDL 32 for packet data are serviced by TMAC 28 over the Transmit DMA Acknowledge Interface 30.5. Incoming packet data from TMAC 28 which is destined for the associated channel FIFO in RAM 30.2.1 is received on the transmit packet data bus (TDAT[31:0]). Valid data on TDAT[31:0] is indicated with the transmit data available (TDAV) signal. The transmit end of transfer (TEOT) signal is used to indicate the end of the current data transfer. The transmit end of packet (TEOP) signal is used to indicate that the current data transfer is the final portion of an HDLC data packet. When a request cannot be honored because no data is available, TNDAV is set high to indicate that the current request has been terminated with no information transferred. An example of the timing relationship over the Transmit DMA Request Interface and the Transmit DMA Acknowledge Interface is illustrated in FIG. 38.

TRANSMIT-SIDE CHANNEL ASSIGNMENT AND LINK COMMUNICATION

Figure 34:
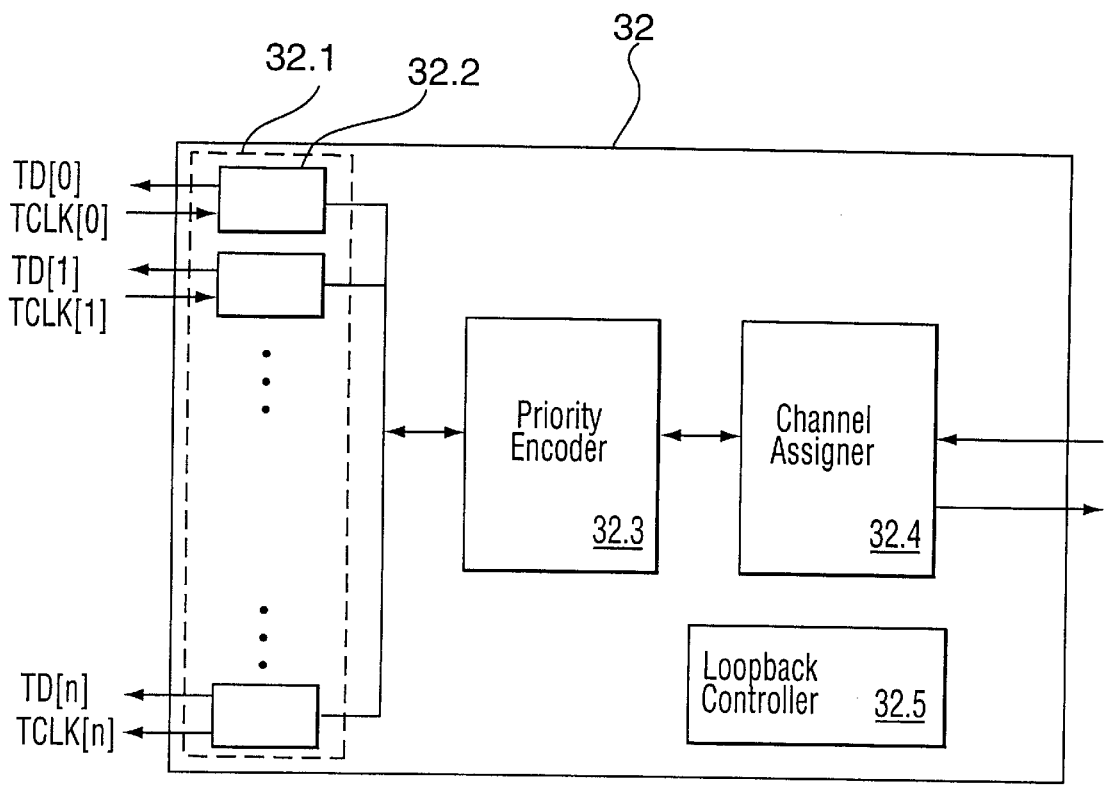
FIG. 34 is a diagram illustrating an embodiment of the Transmit Channel Assigner (TCAS) block in accordance with the present invention.

Referring to FIG. 34, the Transmit Channel Assigner (TCAS) block 32 demultiplexes data from THDL 30 and assigns each byte to one of the physical links. In the embodiment shown, each link is preferably independent and has its own associated clock (TCLK[31:0]).

Figure 35:
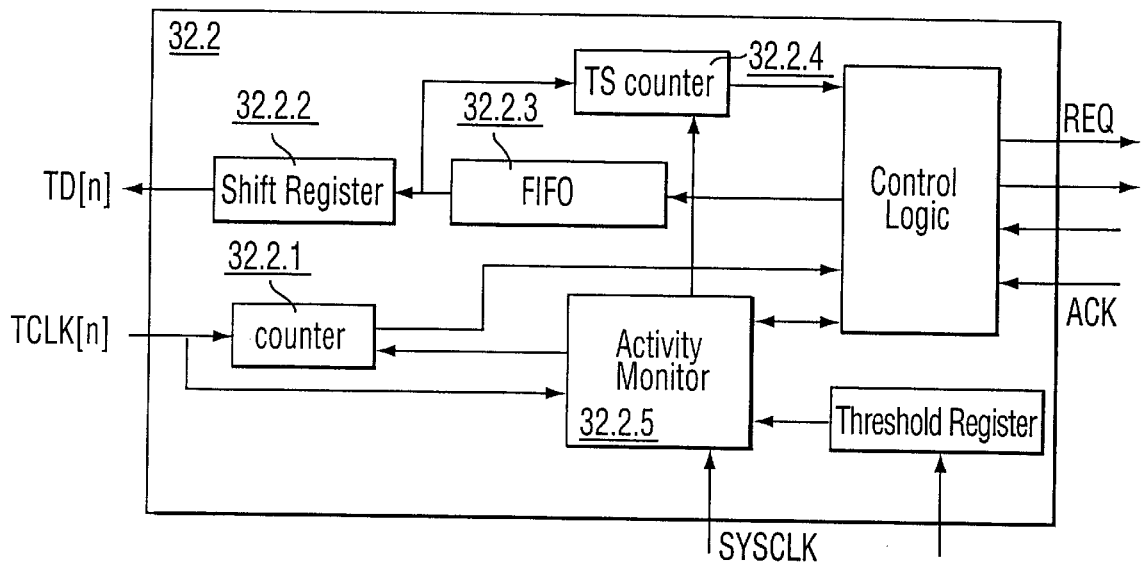
FIG. 35 is a diagram illustrating an embodiment of a line interface in TCAS in accordance with the present invention.

TCAS 32 receives requests for service on line interface block 32.1. In the embodiment illustrated, 32 line interfaces 32.2 are provided. Referring to FIG. 35, each line interface 32.2 includes a bit counter 32.2.1, an 8-bit shift register 32.2.2 and a two-byte FIFO 32.2.3 which, together, perform parallel-to-serial conversion to form a bit-serial stream. When shift register 32.2.2 is updated, a request for service is sent to priority encoder block 32.3 for transmission by channel assigner 32.4 to THDL 30.

In order to support channelised links, each line interface block includes a time-slot counter 32.2.4 and a clock activity monitor 32.2.5. Time-slot counter 32.2.4 is incremented each time shift register 32.2.2 is updated. Clock activity monitor 32.2.5 is a counter which increments at the system clock rate and is cleared by a rising edge of the transmit clock (TLCK[n]). Time-slot counter 32.2.4 and clock activity monitor 32.2.5 provide a mechanism for clock gapping an associated link. Gapping a clock allows one to identify the position of framing bits or bytes, and the most significant bit of time-slot 1 of a channelised link, without the need for a 'data valid' signal for each link. When the counter in clock activity monitor 32.2.5 exceeds a programmable threshold stored in a register in the line interface, a framing bit (T1) or a framing byte (E1) has been detected, in which case the bit and timing slot counters are initialized to indicate that the next bit is the most significant bit (MSB) of the first time-slot. Knowledge of the transmit link and the time-slot identity enables TCAS 34 to perform a table look-up in channel assigner 32.4 to identify the channel from which a data byte is to be sourced.

Figure 36:
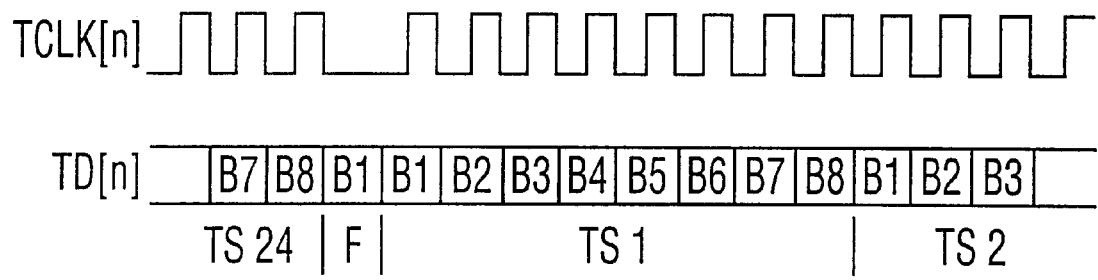
FIG. 36 is a timing diagram illustrating the timing for a channelised T1 transmit link as contemplated in the present invention.

Referring to FIG. 36, there is shown an example of the timing relationship of the transmit clock (TCLK[n]) and the data (TD[n]) signals on a channelised T1 link. The transmit data stream is a T1 frame with a single framing bit (F) followed by octet bound time-slots 1 to 24. TCLK[n] is held quiescent during the framing bit. The most significant bit (B1) of each time-slot is transmitted first. The least significant bit of each time-slot (B8) is transmitted last. TCLK[n] is active continuously at 1.544 MHz during all time-slots. Time-slots which are not provisioned to belong to a channel contain filler bits. For a channelised E1 link, the associated link clock can be gapped during the FAS and NFAS framing bytes.

Figure 37:
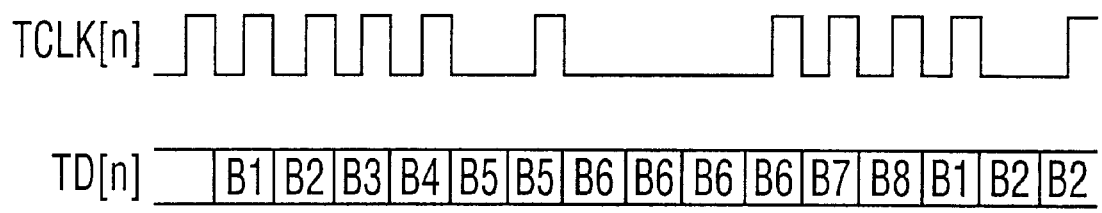
FIG. 37 is a timing diagram illustrating the timing for an unchannelised transmit link as contemplated in the present invention.

For unchannelised links, all data bytes on the link belong to one channel. The associated time-slot counter and activity monitor for an unchannelised link are held in reset. TCLK[n] is externally gapped and is only active during bit times containing data to be transmitted and inactive during bits that are to be ignored by downstream devices. As depicted in FIG. 37, transmit data for an unchannelised link is viewed as a contiguous serial stream and a transmit link may be stalled by holding the corresponding TCLK[n] quiescent.

Referring to FIG. 34, priority encoder 32.3 monitors line interfaces 32.2 for requests and synchronizes them to the SYSCLK timing domain. For the embodiment illustrated, requests are serviced on a fixed priority scheme where highest to lowest priority is assigned from line interface TD[0] to line interface TD[31]. Priority encoder 32.3 selects the request from the link with the highest priority for service ahead of requests from all other links. When there are no pending requests, priority encoder 32.3 generates an idle cycle. In addition, once every n-th SYSCLK cycle (for example, every fourth SYSCLK cycle), priority encoder 32.3 inserts a NULL cycle. No requests from the links are serviced during NULL cycles. Rather, NULL cycles are used by channel assigner 32.4 and THDL Partial Packet Processor 30.2 to permit host microprocessor access to the RAMs contained therein for channel configuration.

Channel assigner block 32.4 determines the channel number of a request selected by priority encoder 32.3 for processing. In the embodiment illustrated, channel assigner 32.4 includes a 1024 word channel provision RAM Channel assigner 32.4 performs a table lookup to indirectly address the channel provision RAM by concatenating the link number and the time-slot number of the highest priority requester. Each word in the channel provision RAM includes a channel number field and a time-slot enable flag. The time-slot enable flag labels the current time-slot as belonging to the channel indicated by the channel number field. If the current time-slot is enabled, channel assigner 32.4 issues a request to THDL 30, along with the channel number and the link number. Incoming data for all channels is received from THDL 30 on the TXDAT[7:0] bus in byte serial format (see FIG. 30).

While the present invention has been described with reference to illustrative embodiments, this description is not intended to be construed in a limiting sense. Various modifications of the illustrative embodiments, as well as other embodiments of the invention, will be apparent to persons skilled in the art upon reference to this description. By way of example, any number of physical links, each having any number of channels, may be coupled to the device. Certain links may have high-speed interface rates while other links may have lower-speed interface rates. In other configurations, all links may have high-speed interface rates or all links may have low-speed interface rates. The number of queues used by the RMAC and TMAC may vary with the selected application. The size and type of channel buffers may also vary in the RHDL and THDL blocks. A variety of management parameters may be included in the RPDs, TDs, and the respective tables. Where active low signals are used, one may readily configure the device for active high or other known signal levels and configurations. Further, while data streams are presented according to the telephonic convention of MSB first, it will be appreciated that device 10 is readily configurable to receive and transmit data according to the data communication standard of presenting the least significant bit (LSB) first. It is therefore contemplated that the appended claims will cover any such modifications or embodiments as fall within the spirit and scope of the invention.

What is claimed is:

1. A multi-channel network device for interfacing between a plurality of physical data links and a control processor, said physical data links characterized by respective corresponding data streams of data packets communicated according to a data link control protocol, said multi-channel network device comprising:

(a) a plurality of channels;

(b) a plurality of receive-side line interfaces, each receive-side line interface corresponding to ones of said channels and operative to: (i) receive incoming data packets arriving from one of said physical data links such that each incoming data packet is received as one or more incoming data segments; and (ii) determine a time-slot number for each incoming data segment arriving on the respective receive-side line interface;

(c) a receive-side priority encoder circuit coupled to said receive-side line interfaces and operative to monitor said receive-side line interfaces and to process the incoming data segments arriving thereon according to a predetermined order of service;

(d) a receive-side channel assigner circuit coupled to said receive-side priority encoder circuit and operative to: (i) assign each incoming data segment processed by said receive-side priority encoder circuit to one of said channels; and (ii) transmit said incoming data segments downstream in a pipeline;

(e) a receive-side time-slice data processor coupled to said receive-side channel assigner circuit and operative to: (i) receive said incoming data segments from said receive-side channel assigner circuit; and (ii) decode said incoming data segments;

(f) a receive-side packet buffer processor coupled to said receive-side time-slice data processor and having a plurality of receive-side channel first-in first-out FIFO buffers, each receive-side channel FIFO buffer corresponding to one of said channels, said receive-side packet buffer processor operative to: (i) receive said incoming data segments from said receive-side time-slice data processor; and (ii) buffer said incoming data segments into corresponding ones of said receive-side channel FIFO buffers;

(g) a control processor interface; and (h) a receive-side packet management circuit coupled to said packet buffer processor and said control processor interface, said receive-side packet management circuit operative to: (i) maintain a plurality of receive-side data packet descriptors, each receive-side data packet descriptor referencing a first memory block where one of said incoming data segments can be stored; (ii) transfer said incoming data segments stored in said receive-side channel FIFO buffers to the control processor via said control processor interface; and (iii) manage the transfer of incoming data seaments using said receive-side data packet descriptors.

2. The multi-channel network device according to claim 1, wherein each receive-side line interface includes a link number and wherein said receive-side channel assigner circuit includes a channel memory block for storing channel numbers, said receive-side channel assigner circuit operative to perform a channel lookup into said channel memory block for each incoming data segment received from said receive-side priority encoder circuit by concatenating the link number of said each receive-side line interface to the time-slot number of said each incoming data segment.

3. The multi-channel network device according to claim 1, wherein ones of said data streams of data packets are characterized by channelized data packets and wherein the ones of said receive-side line interfaces receiving data packets therefrom each includes a clock gap detection circuit operative to determine time-slot alignment in the channelized data packets.

4. The multi-channel network device according to claim 1, wherein ones of said data streams of data packets are channelized, and wherein each of said receive-side line interfaces includes:

(b.1) a serial-to-parallel converter operative to convert incoming data bits from one of said channelized data streams of data packets from serial to parallel, said serial-to-parallel converter having a holding register to hold converted data;

(b.2) a time-slot counter coupled to said holding register and operative to increment each time said holding register is updated with data by said serial-to-parallel converter;

(b.3) a clock activity monitor coupled to said time-slot counter and comprising:

(i) a reference clock input line;

(ii) a threshold register operative to store a predetermined value; and (iii) a clock counter coupled to said reference clock input line and said threshold register; said clock counter operative to increment at a reference clock rate;

wherein said clock activity monitor is operative to initialize said time-slot counter and said clock counter when said clock counter exceeds said predetermined value so as to indicate that a next bit of data arriving in the one of said channelized data streams forms part of a given time-slot of the one of said channelized data streams.

5. The multi-channel network device according to claim 1, wherein said receive-side packet buffer processor includes:

(f.1) a first receive buffer processor operative to write said incoming data segments received from said receive-side time-slice data processor into said receive-side channel FIFO buffers;

(f.2) a second receive buffer processor coupled to said receive-side channel FIFO buffers and operative to transfer ones of said incoming data segments stored in said receive-side channel FIFO buffers to said receive-side packet management circuit; and (f.3) a third receive buffer processor coupled to said first receive buffer processor and said second receive buffer processor, said third receive buffer processor having a plurality of transaction counters, each transaction counter associated with a corresponding one of said receive-side channel FIFO buffers, said third receive buffer processor operative to: (i) increment each transaction counter associated with the ones of said receive-side channel FIFO buffers written to by said first receive buffer processor; (ii) determine if any of the transaction counters exceed a predetermined threshold value; and (iii) for each transaction counter which is determined to exceed the predetermined threshold value in (f.3) (i), signal said second receive buffer processor to transfer ones of said incoming data segments stored in the corresponding receive-side channel FIFO buffer up to a predetermined number and decrement the transaction counter associated therewith.

6. The multi-channel network device according to claim 1, wherein said receive-side packet management circuit is operative to assign ones of said receive-side data packet descriptors to respective ones of said incoming data segments stored in one of said receive-side channel FIFO buffers and to transfer the respective ones of said incoming data segments from the corresponding receive-side channel FIFO buffer to the ones of said first memory blocks referenced by the assigned ones of said receive-side data packet descriptors.

7. The multi-channel network device according to claim 1, wherein said receive-side priority encoder circuit is operative to insert a null cycle periodically into said pipeline of incoming data segments so as to permit a microprocessor to access memory locations in said multi-channel network device.

8. The multi-channel network device according to claim 1, wherein at least one of said receive-side line interfaces is operative to communicate with one of said physical data links at an interface rate different from the interface rates at which the other receive-side line interfaces communicate with their respective physical data links, such difference in interface rate exceeding a tolerance level encountered where said plurality of line interfaces operate at a single nominal data rate.

9. The multi-channel network device according to claim 1, wherein said receive-side time-slice data processor includes a plurality of state vectors, each state vector corresponding to one of said channels and having a plurality of data fields to identify a current state of processing data on the corresponding one of said channels, wherein said receive-side time-slice data processor decodes the ones of said incoming data segments according to information in an associated one of said state vectors.

10. The multi-channel network device according to claim 1, wherein said receive-side time-slice data processor is operative to offset the location of a first incoming data segment of an incoming data packet in the corresponding first memory block referenced by the respective receive-side data packet descriptor so as to permit header information to be pre-pended to said incoming data packet.

11. The multi-channel network device according to claim 1, including a transmit section having a plurality of outgoing data channels and operative to request and receive outgoing data packets in blocks of outgoing data from the control processor for transmission on ones of said physical data links, each block of outgoing data corresponding to one of said outgoing data channels and having at least one outgoing data segment, said transmit section comprising:

(a) a plurality of transmit-side line interfaces, each transmit-side line interface operative to: (i) communicate with one of said physical data links; (ii) generate time slot numbers for channelized communication; and (iii) generate requests for outgoing data;

(b) a transmit-side priority encoder circuit coupled to said transmit-side line interfaces and operative to: (i) monitor said transmit-side line interfaces for requests for outgoing data; and (ii) service said requests for outgoing data according to an order of servicing each of said physical data links;

(c) a transmit-side channel assigner circuit coupled to said transmit-side priority encoder circuit, said transmit-side channel assigner circuit operative to: (i) receive said requests for outgoing data from said transmit-side priority encoder circuit; and (ii) determine the channel number of each request for outgoing data;

(d) a transmit-side time-slice data processor coupled to said transmit-side channel assigner circuit and operative to: (i) receive and process said requests for outgoing data; and (ii) receive and encode ones of said outgoing data;

(e) a transmit-side packet management circuit coupled to the control processor interface and operative to: (i) sort said blocks of outgoing data into linked lists, each linked list corresponding to one of said outgoing data channels; and (ii) request and receive from the control processor ones of said blocks of outgoing data in said linked lists;

(f) a transmit-side packet buffer processor coupled to said transmit-side packet management circuit and said transmit-side time-slice data processor and having a plurality of transmit-side channel FIFO buffers, each transmit-side channel FIFO buffer associated with a respective one of said outgoing data channels, said transmit-side packet buffer processor operative to: (i) receive said requests for outgoing data from said transmit-side time-slice data processor; (ii) signal said transmit-side packet management circuit to request data from the control processor for storage in said transmit-side channel FIFO buffers; (iii) receive ones of said blocks of outgoing data from said transmit-side packet management circuit; and (iv) store each received one of said blocks of outgoing data in the transmit-side channel FIFO buffer corresponding to the same outgoing data channel as the linked list to which the received one of said blocks of outgoing data is associated;

wherein outgoing data segments stored in said transmit-side channel FIFO buffers are retrieved by said transmit-side time-slice data processor for transmission on corresponding ones of said physical data links via said transmit-side line interfaces.

12. The multi-channel network device according to claim 11, wherein said transmit-side channel assigner circuit includes a transmit-side channel memory block operative to store channel numbers, said transmit-side channel assigner circuit operative to perform a channel lookup into said transmit-side channel memory block so as to identify the corresponding outgoing data channel from which said outgoing data is to be sourced through said transmit section.

13. The multi-channel network device according to claim 11, wherein each transmit-side line interface includes a transmit-side clock gap detection circuit operative to determine time-slot alignment for outgoing data on said physical data links.

14. The multi-channel network device according to claim 11, wherein each transmit-side channel FIFO buffer includes a plurality of buffer memory blocks for storing data and wherein said transmit-side packet buffer processor includes:
(a) a first transmit buffer processor coupled to said transmit-side channel FIFO buffers and operative to: (i) send a request for ones of said blocks of outgoing data segments to said transmit-side packet management circuit; and (ii) receive and buffer each requested block into its corresponding transmit-side channel FIFO buffer;
(b) a second transmit buffer processor coupled to said transmit-side channel FIFO buffers and operative to transfer buffered outgoing data segments from said transmit-side channel FIFO buffers to the transmit-side time-slice data processor according to requests from said transmit-side time-slice data processor; and
(c) a third transmit buffer processor coupled to said first transmit buffer processor and said second transmit buffer processor, said third transmit buffer processor having a plurality of pairs of free space counters and packet counters, each free space counter and packet counter pair associated with a corresponding one of said transmit-side channel FIFO buffers, said third transmit buffer processor operative to:
  (i) decrement, for each transmit-side channel FIFO buffer written to by said first transmit buffer processor, the corresponding free space counter by the number of buffer memory blocks used to buffer the block of outgoing data segments;
  (ii) increment, for each transmit-side channel FIFO buffer from which said second transmit buffer processor transfers outgoing data segments stored therein, the corresponding free space counter by the number of buffer memory blocks freed in the respective transfer; and
  (iii) signal said first transmit buffer processor to request data from said transmit-side packet management circuit for ones of said transmit-side channel FIFO buffers according to a predetermined channel order.

15. The multi-channel network device according to claim 11, wherein said third transmit-side packet buffer processor is operative to initiate an expedited request for data to said transmit-side packet management circuit for each transmit-side channel FIFO buffer whose corresponding free space counter is greater than a predetermined free space limit.

16. The multi-channel network device according to claim 11, wherein the requests for outgoing data from said transmit-side priority encoder circuit are transmitted in a transmit-side pipeline to said transmit-side channel assigner circuit and wherein said transmit-side priority encoder circuit is operative to insert a null cycle periodically into said transmit-side pipeline.

17. The multi-channel network device according to claim 11, wherein said transmit-side packet management circuit is operative to: (iii) maintain a plurality of transmit-side data packet descriptors, each transmit-side data packet descriptor referencing an external memory block capable of storing said outgoing data available for transmission from said control processor; and (iv) maintain a transmit-side ready queue and a transmit-side free queue, said transmit-side ready queue referencing ready ones of said transmit-side data packet descriptors whose external memory blocks hold outgoing data available for transfer from said control processor, said transmit-side free queue referencing free ones of said transmit-side data packet descriptors available for managing transfers from the control processor to said transmit-side channel FIFO buffers; and wherein said transmit-side packet management circuit moves ready ones of said transmit-side data packet descriptors from the transmits-side ready queue to the transmit-side free queue upon the transfer of the outgoing data therein to the transmit-side channel FIFO buffers.

18. The multi-channel network device according to claim 11, wherein said transmit-side packet buffer processor is operative to dynamically define the size of each transmit-side channel FIFO buffer so as to accommodate different interface rates on said physical data links.

19. The multi-channel network device according to claim 11, wherein said transmit-side time-slice data processor includes a plurality of state vectors, each state vector corresponding to one of said channels and having a plurality of data fields to identify a current state of processing data on the corresponding outgoing data channel, wherein said transmit-side time-slice data processor is operative to encode said outgoing data according to information in ones of said state vectors corresponding to the same outgoing data channels as outgoing data.

20. A multi-channel network device for interfacing between a plurality of physical data links and at least one control processor, each of said physical data links characterized by a data stream of data packets communicated according to a data link control protocol, said multi-channel network device comprising:
a receive section having a plurality of receive section channel first-in first-out FIFO buffers each corresponding to one of a plurality of receive section data channels, said receive section comprising:
(a) interface means for receiving incoming data packets from said physical data links such that each incoming data packet is received as at least one incoming data segment;
(b) means for determining time-slot numbers for incoming data segments arriving on ones of said physical data links having channelized data streams;
(c) means for servicing said incoming data segments received from said physical data links according to a first predetermined order of service for said physical data links;
(d) means for assigning each incoming data segment serviced by said servicing means to one of said plurality of receive section data channels;
(e) means for transmitting incoming data segments serviced by said servicing means downstream in a receive section pipeline;
(f) means for decoding ones of said incoming data segments in said receive section pipeline;
(g) means for buffering each incoming data segment in said receive section pipeline in one of said receive section channel FIFO buffers; and
(h) means for transferring incoming data segments stored in said receive section channel FIFO buffers to said control processor according to traffic loads on the receive section data channels.

21. The multi-channel network device according to claim 20, including a transmit section having a plurality of transmit section channel FIFO buffers each corresponding to one of a plurality of transmit section data channels, said transmit section comprising:
(a) means for sorting blocks of outgoing data awaiting transmission from said control processor into linked lists, each linked list corresponding to one of said transmit section data channels, each block of data having at least one outgoing data segment;
(b) means for requesting blocks of outgoing data from said control processor for storage in ones of said transmit section channel FIFO buffers, including means for monitoring said transmit section channel FIFO buffers so as to determine if any of said transmit section channel FIFO buffers requires priority service;
(c) means for receiving and storing said blocks of outgoing data in said transmit section channel FIFO buffers;
(d) transmit interface means for transmitting outgoing data segments on said physical data links;
(e) means for monitoring said transmit section interface means so as to identify requests for outgoing data on said physical data links;
(f) means for servicing requests for outgoing data from said transmit section interface means according to a second predetermined order of service;
(g) means for requesting outgoing data segments stored in said transmit section channel FIFO buffers according to the order of requests for outgoing data from said transmit section servicing means;
(h) means for pipelining outgoing data segments from said transmit section channel FIFO buffers to said transmit section interface means for transmission on said physical data links; and
(i) means for encoding ones of said pipelined outgoing data segments prior to transmission on ones of said physical data links.

22. The multi-channel network device according to claim 21, wherein at least one of said data streams is channelized and wherein said receive section includes clock gap detection means for determining time-slot alignment of incoming data segments arriving on the channelized data streams.

23. The multi-channel network device according to claim 22, wherein said transmit section includes clock gap detection means for determining time-slot alignment for outgoing data on said physical data links.

24. The multi-channel network device according to claim 21, wherein said receive section includes means for inserting a null cycle periodically into said receive section pipeline so as to permit a microprocessor to access memory locations in said receive section.

25. The multi-channel network device according to claim 24, wherein said transmit section includes means for inserting a null cycle periodically in between a pair of said requests for outgoing data from said transmit section servicing means so as to permit a second microprocessor to access memory locations in said transmit section.

26. The multi-channel network device according to claim 21, wherein said receive section includes means for offsetting the memory location of a first incoming data segment of an incoming data packet so as to permit header information to be pre-pended to the respective incoming data packet.

27. The multi-channel network device according to claim 21, including means for defining dynamically the size of each first and transmit-side channel FIFO buffer so as to accommodate different interface rates on said physical data links.

28. A method, in a multi-channel network device, of interfacing between a plurality of physical data links and at least one control processor, said physical data links characterized by respective data streams of data packets with each data stream of data packets communicated according to a data link control protocol, said multi-channel network device supporting channelized and unchannelized modes of communication with said physical data links and having a receive section having a plurality of receive-side data channels and a plurality of receive-side line interfaces, each receive-side line interface operative to communicate with a corresponding one of the physical data links, the method comprising the steps of:
receiving incoming data packets arriving on said receive-side line interfaces from the physical data links such that each incoming data packet is received as one or more incoming data segments;
servicing the incoming data segments from said receive-side line interfaces according to a predetermined order of service for the physical data links;
assigning each incoming data segment serviced in said servicing step to one of said receive-side data channels;
pipelining the assigned incoming data segments to a receive-side time-slice data processor having a plurality of receive-side state vectors, each receive-side state vector corresponding to one of said receive-side data channels and having a plurality of data fields to identify a current state of processing data on the corresponding receive-side data channel;
processing ones of said pipelined incoming data segments with said receive-side time-slice data processor according to information in ones of said state vectors corresponding to the same receive-side data channels as the ones of said pipelined incoming data segments;
storing each pipelined incoming data segment in one of a plurality of receive-side channel first-in first-out FIFO buffers, each receive-side channel FIFO buffer corresponding to one of said receive-side data channels;
maintaining a plurality of receive-side data packet descriptors, each receive-side data packet descriptor referencing a first memory block capable of holding one of the pipelined incoming data segments stored in said receive-side channel FIFO buffers;

transferring the pipelined incoming data segments from said receive-side channel FIFO buffers via an nbit data bus to the first memory blocks using said receive-side data packet descriptors; and managing the transfer of the pipelined incoming data segments in said transferring step according to traffic loads on the receive-side data channels.

29. The method according to claim 28, wherein each receive-side line interface includes a link number and is operative to determine time-slot numbers for the incoming data segments arriving thereon, and wherein said assigning step includes the step of:

performing a channel lookup for each incoming data segment serviced in said servicing step by concatenating the link number of the corresponding receive line interface to the time-slot number of the incoming data segment currently being serviced.

30. The method according to claim 28, wherein at least one of said data streams is characterized by channelized data packets, and wherein said receiving step includes the step of:

detecting a gap in clock signals on the ones of said receive-side line interfaces receiving said channelized data packets so as to determine time-slot alignment in the channelized data packets.

31. The method according to claim 28, wherein each receive-side channel FIFO buffer has a corresponding one of a plurality of transaction counters and said storing step includes the steps of:

determining a channel number for a current data segment of said pipelined incoming data segments;

identifying the receive-side channel FIFO buffer corresponding to said channel number;

writing the current data segment into the receive-side channel FIFO buffer identified in said identifying step;

incrementing the transaction counter associated with the identified receive-side channel FIFO buffer;

repeating said determining, identifying, writing & incrementing steps for each pipelined incoming data segment;

testing if any of the transaction counters exceed a predetermined threshold value; and for each transaction counter which is determined to exceed the predetermined threshold value in said testing step, requesting a receive-side packet management circuit manage transferring data from the corresponding receive-side channel FIFO buffer to ones of said first memory blocks.

32. The method according to claim 28, including the step of:

inserting a null cycle periodically into said pipelined incoming data segments so as to permit a microprocessor to access memory locations in said multichannel network device.

33. The method according to claim 28, including the step of:

adjusting the size of said receive-side channel FIFO buffers so as to permit said receive section to accomodate different interface rates on the physical data links.

34. The method according to claim 28, wherein said multi-channel network device includes a transmit section having a plurality of transmit-side data channels and is operative to receive outgoing data packets in blocks of data from the control processor for transmission on ones of the physical data links, each block of outgoing data corresponding to one of said transmit-side data channels and having at least one data segment of a plurality of outgoing data segments, said method including the steps of:

maintaining a plurality of transmit-side data packet descriptors, each transmit-side data packet descriptor referencing a second memory block capable of holding one of the outgoing data segments;

sorting said blocks of outgoing data awaiting transmission from the control processor into linked lists, each linked list corresponding to one of said transmit-side data channels;

monitoring a plurality of transmit-side channel FIFO buffers so as to manage traffic loads in said transmit section, each transmit-side channel FIFO buffer corresponding to one of said transmit-side data channels;

requesting data from the control processor for storage in said transmit-side channel FIFO buffers according to the results of said monitoring step;

receiving ones of said blocks of outgoing data from the control processor according to said requesting step and using said transmit-side data packet descriptors to manage reception of said blocks;

writing each received block of outgoing data in the transmit-side channel FIFO buffer corresponding to the same transmit-side data channel as the linked list to which the received block is associated;

requesting outgoing data from said transmit-side channel FIFO buffers for transmission on ones of said physical data links according to a predetermined order of servicing the transmissions to the ones of said physical data links;

determining the transmit-side data channels associated with said requests for outgoing data;

pipelining to a transmit-side time-slice data processor ones of said outgoing data segments stored in those transmit-side channel FIFO buffers associated with the same transmit-side data channels as said requests for outgoing data;

processing with said transmit-side time-slice data processor said outgoing data pipelined thereto; and transmitting each outgoing data segment received by said transmit-side time-slice data processor to its corresponding physical data link via a respective transmit-side line interface, including, for channelized communications, identifying the time-slots on which to transmit data to the corresponding physical data link.

35. The method according to claim 34, wherein the step of determining the transmit-side data channels associated with said requests for outgoing data includes the step of:

performing a transmit channel lookup to identify the corresponding transmit-side data channel on which outgoing data segments are to be sourced.

36. The method according to claim 34, wherein at least one of said data streams is characterized by channelized data packets, and wherein the step of transmitting each outgoing data segment received by said transmit-side time-slice data processor to its corresponding physical data link via a respective transmit-side line interface includes the step of:

detecting a gap between transmit clock signals on each respective transmit-side line interface communicating with said channelized data streams so as to determine time-slot alignment therein.

37. The method according to claim 34, wherein each transmit-side channel FIFO buffer includes a plurality of buffer memory blocks for storing data and said transmit section includes a plurality of pairs of free space counters and packet counters, each free space counter and packet counter pair associated with a corresponding one of said transmit-side channel FIFO buffers, and wherein the method includes the steps of:

for each transmit-side channel FIFO buffer written to in said writing step, decrementing the corresponding free space counter by the number of buffer memory blocks used to store the corresponding block of outgoing data stored therein;

for each transfer of stored outgoing data segments from ones of said transmit-side channel FIFO buffers to said transmit-side time-slice data processor, incrementing the corresponding free space counter by the number of buffer memory blocks freed in the transfer;

wherein said monitoring step includes determining if any of said free space counters have values greater than a predetermined free space limit; and wherein said step of requesting data from said control processor includes initiating an expedited request for data to said control processor on behalf of each transmit-side channel FIFO buffer whose free space counter is determined to be greater than said predetermined free space limit.

38. The method according to claim 34, including the step of:

inserting a null cycle periodically into said pipelined outgoing data segments so as to permit a microprocessor to access memory locations in the transmit section.

39. The method according to claim 34, including the step of:

adjusting the size of each transmit-side channel FIFO buffer so as to permit said transmit section to accommodate different interface rates on the physical data links.

40. The method according to claim 34, wherein the sorting step for said transmit section includes the step of:

creating two linked lists per transmit-side data channel so as to sort blocks of outgoing data for each transmit-side data channel according to two levels of priority.

41. A multi-channel network device for interfacing between a plurality of physical data links and a control processor, each of said physical data links characterized by a data stream of data packets communicated according to a data link control protocol, said multi-channel network device comprising:

a transmit section having a plurality of outgoing data channels and operative to request and receive outgoing data packets in blocks of outgoing data from the control processor for transmission on ones of said physical data links, each block of outgoing data corresponding to one of said outgoing data channels and having at least one outgoing data segment, said transmit section comprising:

(a) a plurality of transmit-side line interfaces, each transmit-side line interface operative to: (i) communicate with one of said physical data links; (ii) generate time slot numbers for channelized communication; and (iii) generate requests for outgoing data;

(b) a transmit-side priority encoder circuit coupled to said transmit-side line interfaces and operative to: (i) monitor said transmit-side line interfaces for requests for outgoing data; and (ii) service said requests for outgoing data according to an order of servicing each of said physical data links;

(c) a transmit-side channel assigner circuit coupled to said transmit-side priority encoder circuit, said transmit-side channel assigner circuit operative to: (i) receive said requests for outgoing data from said transmit-side priority encoder circuit; and (ii) determine the channel number of each request for outgoing data;

(d) a transmit-side time-slice data processor coupled to said transmit-side channel assigner circuit and operative to: (i) receive and process said requests for outgoing data; and (ii) receive and encode said outgoing data;

(e) a control processor interface;

(f) a transmit-side packet management circuit coupled to the control processor interface and operative to: (i) sort said blocks of outgoing data into linked lists, each linked list corresponding to one of said outgoing data channels; and (ii) request and receive from the control processor ones of said blocks of outgoing data in said linked lists;

(g) a transmit-side packet buffer processor coupled to said transmit-side packet management circuit and said transmit-side time slice data processor and having a plurality of transmit-side channel FIFO buffers, each respective one of said outgoing data channels, said transmit-side packet buffer processor operative to: (i) receive said requests for out going data from said transmit-side time-slice data processor; (ii) signal said transmit-side packet management circuit to request data from the control processor for storage in said transmit-side channel FIFO buffers; (iii) receive ones of said blocks of outgoing data in the transmit-side channel FIFO buffer corresponding to the same outgoing data channel as the linked list to which the received one of said blocks of outgoing data is associated;

wherein outgoing data segments stored in said transmit-side channel FIFO buffers are retrieved by said transmit-side time-slice data processor for transmission on corresponding ones of said physical data links via said transmit-side line interfaces.

42. The multi-channel network device according to claim 41, wherein said transmit-side channel assigner circuit includes a transmit-side channel memory block operative to store channel numbers, said transmit-side channel assigner circuit operative to perform a channel lookup into said transmit-side channel memory block so as to identify the corresponding outgoing data channel from which ones of said outgoing data segments are to be sourced through said transmit section.

43. The multi-channel network device according to claim 41, wherein each transmit-side line interface includes a transmit-side clock gap detection circuit operative to determine time-slot alignment for outgoing data on said physical data links.

44. The multi-channel network device according to claim 41, wherein each transmit-side channel FIFO buffer includes a plurality of buffer memory blocks for storing data and wherein said transmit-side packet buffer processor includes:

(a) a first transmit buffer processor coupled to said transmit-side channel FIFO buffers and operative to: (i) send a request for ones of said blocks of outgoing data segments to said transmit-side packet management circuit; and (ii) receive and buffer each requested block into its corresponding transmit-side channel FIFO buffer;

(b) a second transmit buffer processor coupled to said transmit-side channel FIFO buffers and operative to transfer buffered outgoing data segments from said transmit-side channel FIFO buffers to the transmit-side time-slice data processor according to requests from said transmit-side time-slice data processor; and (c) a third transmit buffer processor coupled to said first transmit buffer processor and said second transmit buffer processor, said third transmit buffer processor having a plurality of pairs of free space counters and packet counters, each free space counter and packet counter pair associated with a corresponding one of said transmit-side channel FIFO buffers, said third transmit buffer processor operative to:

(i) decrement, for each transmit-side channel FIFO buffer written to by said first transmit buffer processor, the corresponding free space counter by the number of buffer memory blocks used to buffer the block of outgoing data segments;

(ii) increment, for each transmit-side channel FIFO buffer from which said second transmit buffer processor transfers outgoing data segments stored therein, the corresponding free space counter by the number of buffer memory blocks freed in the respective transfer; and (iii) signal said first transmit buffer processor to request data from said transmit-side packet management circuit for ones of said transmit-side channel FIFO buffers according to a predetermined channel order.

45. The multi-channel network device according to claim 41, wherein said transmit-side packet buffer processor is operative to initiate and expedited request for data to said transmit-side packet management circuit for each transmit-side channel FIFO buffer whose corresponding free space counter is greater than a predetermined free space limit.

46. The multi-channel network device according to claim 41, wherein the requests for outgoing data from said transmit-side priority encoder circuit are transmitted in a transmit-side pipeline to said transmit-side channel assigner circuit and wherein said transmit-side priority encoder circuit is operative to insert a null cycle periodically into said transmit-side pipeline.

47. The multi-channel network device according to claim 41, wherein said transmit-side packet management circuit is operative to: (iii) maintain a plurality of transmit-side data packet descriptors, each transmit-side data packet descriptor referencing an external memory block capable of storing ones of said outgoing data segments available for transmission from said control processor; and (iv) maintain a transmit-side ready queue and a transmit-side free queue, said transmit-side ready queue referencing ready ones of said transmit-side data packet descriptors whose external memory blocks hold outgoing data segments available for transfer from said control processor, said transmit-side free queue referencing free ones of said transmit-side data packet descriptors available for managing transfers from the control processor to said transmit-side channel FIFO buffers; and wherein said transmit-side packet management circuit moves ready ones of said transmit-side data packet descriptors from the transmits-side ready queue to the transmit-side free queue upon the transfer of the outgoing data segments therein to the transmit-side channel FIFO buffers.

48. A data link layer interface, in a multi-channel network processor operative to receive data packets from a plurality of channelized data streams communicated according to a data link control protocol, each data packet being pipelined through the multi-channel network processor as at least one data segment, the multi-channel network processor having a channel assigner circuit and a time-slice data processor, said data link layer interface comprising:

(a) an n-bit wide input bus, coupled from said channel assigner circuit to said time-slice data processor, for receiving a pipelined stream of data segments;

(b) a k-bit wide channel bus, coupled from said channel assigner circuit to said time-slice data processor, for receiving a data channel number associated with each of said data segments on said n-bit wide input bus;

(c) a reference clock line, coupled to said time-slice data processor, for receiving a reference clock so as to sample data on said n-bit wide input bus according to said reference clock;

(d) a data valid line, coupled from said channel assigner circuit to said time-slice data processor, for signaling when said n-bit wide input bus contains valid data; and (e) a null data line, coupled from said channel assigner circuit to said time-slice data processor, for reporting a null cycle on said data link layer interface.

49. A method of communicating between a multi-channel network device and a host having host memory with associated buffers comprising:

(a) defining a plurality of data packet descriptors describing a size and location of said buffers in said host memory and packet status information, said data packet descriptors for use in managing communication of partial packets between said multi-channel network device and a control processor;

(b) identifying a memory block where one of said partial packets can be stored utilizing an address field operative to identify the memory block in a data buffer;

(c) establishing a usage field operative to indicate an amount of said host memory required by one of the partial packets stored therein;

(d) utilizing a data channel code field operative to identify a data channel associated with said one partial packet stored in said host memory identified by said address field;

(e) chaining data packet descriptors to link one data packet descriptor to another data packet descriptor so as to allow said partial packets to be chained into a linked list; and (f) indicating an end of said linked list of data packet descriptors utilizing an end-of-chain.

* * * * *